(12) United States Patent
Sharma

(10) Patent No.: US 12,341,705 B2
(45) Date of Patent: Jun. 24, 2025

(54) GENERIC MULTI-CLOUD INFRASTRUCTURE FOR COMPOSING HETEROGENEOUS CLOUD RESOURCES

(71) Applicant: Dell Products L.P., Round Rock, TX (US)

(72) Inventor: Anurag Sharma, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 187 days.

(21) Appl. No.: 18/356,567

(22) Filed: Jul. 21, 2023

(65) Prior Publication Data

US 2025/0030647 A1    Jan. 23, 2025

(51) Int. Cl.
*H04L 47/70* (2022.01)
*G06F 9/50* (2006.01)
*H04L 47/78* (2022.01)

(52) U.S. Cl.
CPC ............. *H04L 47/82* (2013.01); *G06F 9/50* (2013.01); *G06F 9/5077* (2013.01); *H04L 47/788* (2013.01); *G06F 2209/501* (2013.01)

(58) Field of Classification Search
CPC ......... H04L 47/82; H04L 47/788; G06F 9/50; G06F 9/5077; G06F 2209/501
See application file for complete search history.

(56) References Cited

U.S. PATENT DOCUMENTS

| | | | |
|---|---|---|---|
| 2012/0215918 A1* | 8/2012 | Vasters | H04L 67/02 709/226 |
| 2016/0164753 A1* | 6/2016 | Cimprich | G06F 9/5011 709/222 |
| 2018/0322558 A1* | 11/2018 | Padmanabh | G06Q 30/0603 |
| 2020/0409714 A1* | 12/2020 | Qian | G06F 9/4875 |
| 2021/0337021 A1* | 10/2021 | Baddepudi | H04L 67/101 |

* cited by examiner

*Primary Examiner* — Abdulkader M Alriyashi
(74) *Attorney, Agent, or Firm* — Chamberlain, Hrdlicka, White, Williams & Aughtry; Aly Z. Dossa

(57) ABSTRACT

Techniques described herein relate to a method for provisioning and managing resources on resource providers. The method may include obtaining, by a primary resource provider (RP) node in an RP environment, node information associated with other RP nodes in the RP environment; instantiating a blueprint orchestrator using a blueprint orchestrator template; in response to instantiating the blueprint orchestrator: identifying a user associated with the RP environment using a user order file; identifying a first RP type and a second RP type associated with the user; providing prompt files associated with the first RP type and the second RP type to the user; obtaining answer files associated with the prompt files from the user; generating a blueprint based on the answer files and a blueprint template; composing RP resources on the RP environment using the blueprint and node information; and performing operations on the RP resources using the blueprint.

20 Claims, 14 Drawing Sheets

GENERIC MULTI-CLOUD INFRASTRUCTURE FOR COMPOSING HETEROGENEOUS CLOUD RESOURCES

BACKGROUND

Computing devices may provide services. To provide the services, the computing devices may implement resources provided by resource providers. To implement the resources, the computing devices may require software associated with the resource providers. Resource providers may be associated with their own native functionality. To use the resources and LCM resources provided by the resource providers, the computing devices may be required to invoke the native functionality of the resource providers using the software associated with the computing devices.

SUMMARY

In general, certain embodiments described herein relate to a method for provisioning and managing resources on resource providers. The method may include obtaining, by a primary resource provider (RP) node in an RP environment, node information associated with other RP nodes in the RP environment; instantiating a blueprint orchestrator using a blueprint orchestrator template; in response to instantiating the blueprint orchestrator: identifying a user associated with the RP environment using a user order file; identifying a first RP type and a second RP type associated with the user; providing prompt files associated with the first RP type and the second RP type to the user; obtaining answer files associated with the prompt files from the user; generating a blueprint based on the answer files and a blueprint template; composing RP resources on the RP environment using the blueprint and node information; and performing operations on the RP resources using the blueprint.

In general, certain embodiments described herein relate to a system for provisioning and managing resources on resource providers. The system includes a resource provider (RP) environment. The system also includes a primary RP node of the RP environment that includes a processor and memory and is programmed to obtain node information associated with other RP nodes in the RP environment; instantiate a blueprint orchestrator using a blueprint orchestrator template; in response to instantiating the blueprint orchestrator: identify a user associated with the RP environment using a user order file; identify a first RP type and a second RP type associated with the user; provide prompt files associated with the first RP type and the second RP type to the user; obtain answer files associated with the prompt files from the user; generate a blueprint based on the answer files and a blueprint template; compose RP resources on the RP environment using the blueprint and node information; and perform operations on the RP resources using the blueprint.

In general, certain embodiments described herein relate to a non-transitory computer readable medium that includes computer readable program code, which when executed by a computer processor enables the computer processor to perform a method for provisioning and managing resources on resource providers. The method may include obtaining, by a primary resource provider (RP) node in an RP environment, node information associated with other RP nodes in the RP environment; instantiating a blueprint orchestrator using a blueprint orchestrator template; in response to instantiating the blueprint orchestrator: identifying a user associated with the RP environment using a user order file; identifying a first RP type and a second RP type associated with the user; providing prompt files associated with the first RP type and the second RP type to the user; obtaining answer files associated with the prompt files from the user; generating a blueprint based on the answer files and a blueprint template; composing RP resources on the RP environment using the blueprint and node information; and performing operations on the RP resources using the blueprint.

Other aspects of the embodiments disclosed herein will be apparent from the following description and the appended claims.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

DETAILED DESCRIPTION

Figure 1A:
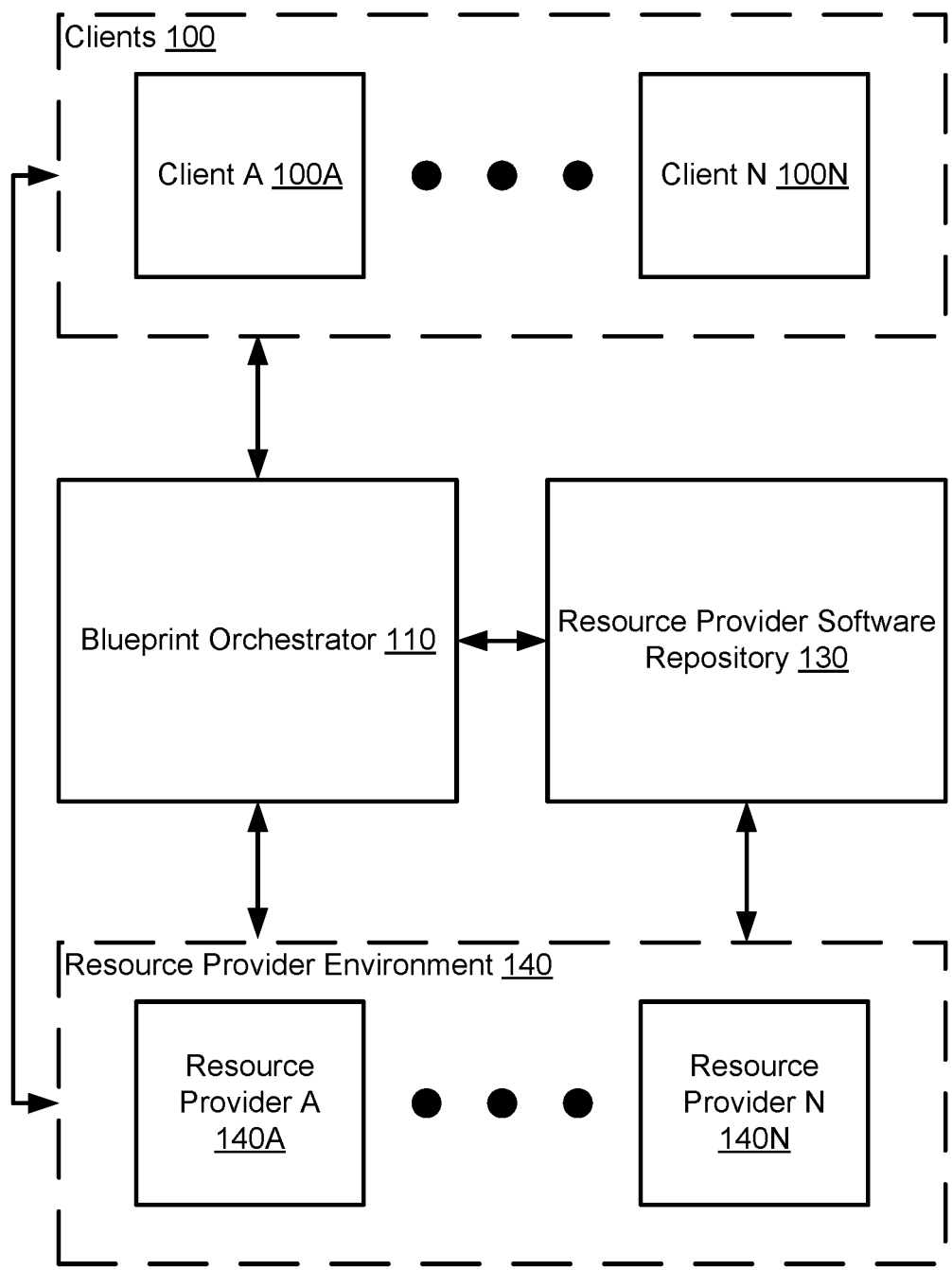
FIG. 1A shows a diagram of a system in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments of the present embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments disclosed herein relate to systems, non-transitory computer readable mediums, and methods for composing heterogeneous cloud resources in a heterogeneous resource provider environment using blueprints.

Each cloud resource provider type may include its own specification for representing cloud resources in a declarative format (e.g., infrastructure-as-code (IaC)). The cloud resource specification may include similar components, but may be associated with their own native resource provider functionality. It is extremely challenging and complex to compose heterogeneous cloud resources in a resource provider environment associated with multiple different resource providers to compose and perform generic operations on these cloud resources using the native resource provider functionality associated with each cloud resource. Existing solutions that define abstractions for mapping between a blueprint and cloud provider functionality may require user to implement proprietary solutions and change their environments to conform to these solutions. Additionally, the existing solutions may experience serious implementation problems as cloud resource providers may often change their specifications and, as a result, their native functionalities. It may be difficult for users of these existing solutions to keep up with these changes. Moreover, existing solutions are extremely rigid and inflexible. The underlying infrastructure (e.g., nodes in a data center) fail to enable a user to repurpose the infrastructure to easily add more resources or change resources and resource providers executing on nodes.

To address, at least in part, the various challenges discussed above, embodiments disclosed herein may enable a user to order resource provider (RP) nodes to form an RP environment capable of providing a turnkey resource provider environment experience. As a result, the RP nodes of the RP environment include the functionality to compose a system of resources from multiple types of cloud resource providers with a blueprint that enables users to perform RP operations on the different resources of the different resource providers using generic requests. Additionally, previously composed nodes may be repurposed from one RP type to another without requiring the user to obtain more RP nodes. Such a composition and repurposing of resources in a heterogeneous resource provider environment may require minimal user involvement. As a result, the complexity faced by the user associated with the generation and refurbishing of resources in a heterogeneous resource provider environment that includes multiple types of resource providers that each include their own native functionality may be significantly reduced. Furthermore, flexibility in composing and refurbishing such systems may be greatly improved.

FIG. 1A shows a diagram of a system in accordance with one or more embodiments disclosed herein. The system may include clients (100), a blueprint orchestrator (110), a resource provider software repository (130), and a resource provider environment (140). In one or more embodiments, the clients (100) may obtain blueprint services from the blueprint orchestrator (110) and resource provider services from the resource provider environment (140). The blueprint services provided by the blueprint orchestrator (110) may include generating blueprints for clients (100) and performing resource provider operations in response to obtaining requests from the clients (100) using associated blueprints. By utilizing such services, the clients (100) may be able to efficiently provision and perform operations on resources in the resource provider environment (140) for heterogeneous resource providers. The system may include other, fewer, and/or additional components without departing from embodiments disclosed herein.

The components of the system illustrated in FIG. 1A may be operatively connected to each other and/or operatively connected to other entities (not shown) via any combination of wired (e.g., Ethernet) and/or wireless networks (e.g., Wide Area Networks (WANs), Local Area Networks (LANs), Internet, etc.) (not shown). Each component of the system illustrated in FIG. 1A is discussed below.

The clients (100) may be implemented using one or more computing devices. A computing device may be, for example, a mobile phone, tablet computer, laptop computer, desktop computer, server, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2A-4C. The clients (100) may be implemented using other types of computing devices without departing from embodiments disclosed herein. For additional details regarding computing devices, refer to FIG. 5.

The clients (100) may be implemented using logical devices without departing from embodiments disclosed herein. For example, the clients (100) may include virtual machines that utilize computing resources of any number of physical computing devices to provide the functionality of the clients (100). The clients (100) may be implemented using other types of logical devices without departing from embodiments disclosed herein.

In one or more embodiments disclosed herein, the clients (100) may be programmed to, or otherwise configured to, include the functionality to obtain blueprint generation services from the blueprint orchestrator (110) and obtain resource provider services from the resource provider environment (140). To obtain the blueprint generation services and the resource provider services, the clients (100) may include the functionality to generate and transmit requests and information to and from the blueprint orchestrator (110) and/or resource providers (e.g., 140A) of the resource provider environment. The clients (100) may also include the functionality to perform other computer implemented services without departing from embodiments disclosed herein. The computer implemented services may include, for example, database services, inferencing services, electronic mail communication services, and/or any other computer implemented services without departing from embodiments disclosed herein. The clients (100) may include the functionality to perform all, or a portion, of the methods of FIGS. 2A-4C. The clients (100) may include other and/or additional functionalities without departing from embodiments disclosed herein.

A system in accordance with one or more embodiments disclosed herein may include any number of clients (e.g., 100A, 100N) without departing from embodiments disclosed herein. For example, a system may include a single client (e.g., 100A) or multiple clients (e.g., 100A, 100N).

In one or more embodiments disclosed herein, the blueprint orchestrator (110) may be implemented using one or more computing devices. A computing device may be, for example, a mobile phone, tablet computer, laptop computer, desktop computer, server, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2A-4C. The blueprint orchestrator (110) may be implemented using other types of computing devices without departing from embodiments disclosed herein. For additional details regarding computing devices, refer to FIG. 5.

The blueprint orchestrator (110) may be implemented using logical devices without departing from embodiments disclosed herein. For example, the blueprint orchestrator (110) may include virtual machines that utilize computing resources of any number of physical computing devices to provide the functionality of the blueprint orchestrator (110). The blueprint orchestrator (110) may be implemented using other types of logical devices without departing from embodiments disclosed herein.

In one or more embodiments disclosed herein, the blueprint orchestrator (110) may be programmed to, or otherwise configured to, include the functionality to perform blueprint services for clients (100). To perform blueprint services, the blueprint orchestrator (110) may include the functionality to obtain and/or transmit requests and/or information to and from the clients (100). The blueprint orchestrator (110) may also include the functionality to generate and/or transmit requests and information to and/or from the resource providers (e.g., 140A, 140N) of the resource provider environment (140) to perform blueprint services. The blueprint services may include generating blueprints associated with one or more resources that a client (e.g., user of a client) desires to provision in the resource provider environment (140). The blueprint services may further include obtaining generic requests and generic lifecycle management requests from the clients and implementing those requests in the resource provider environment (140) on provisioned resources using corresponding blueprints. The blueprint orchestrator (110) may include the functionality to perform all, or a portion, of the methods of FIGS. 2A-4C. The blueprint orchestrator (110) may include other and/or additional functionalities without departing from embodiments disclosed herein. For additional information regarding the blueprint orchestrator (110), refer to FIG. 1B and FIGS. 2A-4C.

In one or more embodiments disclosed herein, the resource provider software repository (130) may be implemented using one or more computing devices. A computing device may be, for example, a mobile phone, tablet computer, laptop computer, desktop computer, server, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIG. 2A. The resource provider software repository (130) may be implemented using other types of computing devices without departing from embodiments disclosed herein. For additional details regarding computing devices, refer to FIG. 5.

The resource provider software repository (130) may be implemented using logical devices without departing from embodiments disclosed herein. For example, the resource provider software repository (130) may include virtual machines that utilize computing resources of any number of physical computing devices to provide the functionality of the resource provider software repository (130). The resource provider software repository (130) may be implemented using other types of logical devices without departing from embodiments disclosed herein.

In one or more embodiments disclosed herein, the resource provider software repository (130) may be programmed to, or otherwise configured to, include the functionality to obtain, generate, maintain, and/or provide specification files and/or software packages associated with the resource providers of the resource provider environment (140). Each resource provider may provide one or more resources as services that may be executed on RP nodes (discussed below) of the resource provider environment (140). The resources may include resource provider (RP) resources and/or lifecycle management (LCM) resources (discussed below). Each resource may be associated with a specification file and a software package. The specification file may refer to a file or other data structure that includes information associated with the resource. The spec file may include a resource type, a resource provider identifier, a resource identifier, resource version, a list of required component sub-service instances (e.g., a load balancer, container manager, etc.). The spec file may include other and/or additional information associated with the corresponding resource without departing from embodiments disclosed herein. The software package may include information that may be used to execute the one or more resources associated with the software package. The software package may include, for example, a list of native application programming interface (API) calls or operation calls in a format native to the resource provider, software libraries, binaries, resource images, etc. that may be used by an RP node to execute the resource. The software package may include other and/or additional information associated with the resource and the corresponding resource providers without departing from embodiments disclosed herein.

In one or more embodiments, the specification files and/or software packages may be stored in one or more storages of the resource provider environment (130) or one or more storages operatively connected to the resource provider environment (130). In one or more embodiments, the resource provider environment (130) may be updated and/or maintained by a user (e.g., system administrator) and/or a third party entity (not shown). The third party entity may be, for example, a developer of the resource providers. For example, a user may upload or otherwise add, delete, modify, and/or upgrade resource specification files and/or software packages included in the resource provider environment (130) over time. The specification files and/or software packages included in the resource provider environment (130) may be provided to and used by the blueprint orchestrator (110) to generate blueprints and perform blueprint services. The specification files and/or software packages included in the resource provider environment (130) may be provided to and used by the RP nodes of the resource provider environment (140) to execute resources (e.g., RP resources and LCM resources) as services. The resource provider environment (140) may include other and/or additional functionalities without departing from embodiments disclosed herein.

In one or more embodiments, the resource provider environment (140) may include the functionality to execute resources of resource providers as services for the clients (100). The resource provider environment (140) may executes resources of any nonzero quantity of resource providers without departing from embodiments disclosed herein. For example, the resource provider environment (140) may include resource provider A (140A) and resource provider N (140N). As used herein, a resource provider (e.g., 140A, 140N) may refer to a cloud service provider that may provide clients (100) or users thereof with one or more resources offered by the cloud service provider. The resource providers (e.g., 140A, 140N) may include any cloud service provider without departing from embodiments disclosed herein. Each resource provider may provide similar and/or different resources.

For example, resource provider A (140A) may provide bare-metal server resources and resource provider N (140N) may provide container resources. As another example, resource provider A (140A) may provide a first type of container resources and resource provider N (140N) may provide a second type of container resources. Each resource provider (e.g., 140A, 140N) may be associated with their own unique native format to provision and/or call for the performance of various generic operations (e.g., create, update, read, delete, etc.) on the resources of the resource provider. As a result, a client (100) may generate, compose, or provision a heterogeneous system of resources in the resource provider environment (140) associated with multiple different resource providers (e.g., 140A, 140N). To efficiently manage such a heterogeneous system, the clients (100) may obtain blueprint services from the blueprint orchestrator (110). For additional information regarding the resource provider environment (140), refer to FIGS. 1C-1D.

Figure 1B:
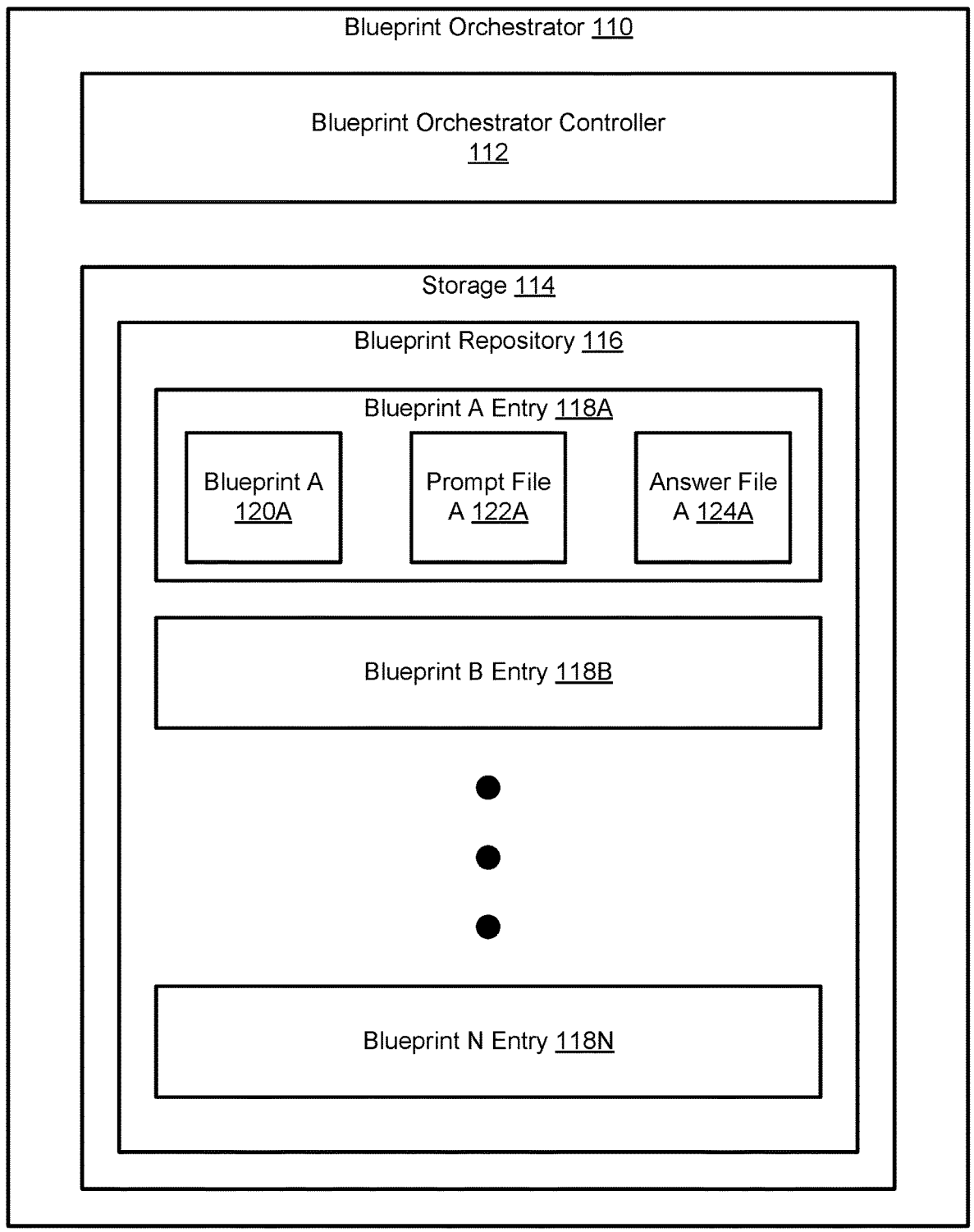
FIG. 1B shows a diagram of a blueprint orchestrator in accordance with one or more embodiments disclosed herein.

FIG. 1B shows a diagram of a blueprint orchestrator in accordance with one or more embodiments disclosed herein. The blueprint orchestrator (110) may be an embodiment of the blueprint orchestrator (e.g., 110, FIG. 1A) discussed above. As discussed above, the blueprint orchestrator (110) may include the functionality to perform blueprint services. Also as discussed above, the blueprint services may include generating blueprints and performing operations on resources executing in the resource provider environment (140, FIG. 1A) in response to requests from clients (100, FIG. 1A). To provide the aforementioned services, the blueprint orchestrator (110) may include a blueprint orchestrator controller (112) and storage (114). The blueprint orchestrator (110) may include other, fewer, and/or additional components without departing from embodiments disclosed herein. Each of the aforementioned components of the blueprint orchestrator (110) is discussed below.

In one or more embodiments disclosed herein, the blueprint orchestrator controller (112) may be implemented as a physical device. The physical device may include circuitry. The physical device may be, for example, a field-programmable gate array, application specific integrated circuit, programmable processor, microcontroller, digital signal processor, or other hardware processor. The physical device may be programmed or otherwise configured to provide the functionality of the blueprint orchestrator controller (112) described throughout this Detailed Description.

In one or more embodiments disclosed herein, the blueprint orchestrator controller (112) may be implemented as computer instructions, e.g., computer code, stored on a storage that when executed by a processor of the blueprint orchestrator (110) causes the blueprint orchestrator (110) to provide the functionality of the blueprint orchestrator controller (112) described throughout this Detailed Description.

In one or more embodiments disclosed herein, the blueprint orchestrator controller (112) may include the functionality to provide the blueprint services performed by the blueprint orchestrator (110). The blueprint orchestrator controller (112) may: (i) obtain requests from one or more clients (100, FIG. 1A), (ii) provide prompt files (discussed below) to clients (100, FIG. 1A), (iii) obtain answer files from clients (100, FIG. 1A) based on the prompt files, (iv) generate blueprints using the answer files and the resource provider software repository (130, FIG. 1A), and/or (v) perform operations on resources executing in the resource provider environment (140, FIG. 1A). The blueprint orchestrator controller (112) may include other and/or additional functionality without departing from embodiments disclosed herein. For additional information regarding performing blueprint services, refer to FIGS. 2A-3B.

In one or more embodiments disclosed herein, the storage (114) may be implemented using a storage device. The storage device may be implemented using physical storage devices and/or logical storage devices. The storage (114) may be implemented using other types of devices that provide data storage services without departing from the embodiments disclosed herein.

A logical storage device may be an entity that utilizes the physical storage devices of one or more computing devices to provide data storage services. For example, a logical storage may be a virtualized storage that utilizes any quantity of storage resources (e.g., physical storage devices) of any number of computing devices.

A physical storage device may be a physical device that provides data storage services. For example, a physical storage device may include any number of physical devices such as, for example, hard disk drives, solid state drives, tape drives, and/or other types of hardware devices that store data. The physical storage device may include any number of other types of hardware devices for providing data storage services. For example, the physical storage device may include storage controllers that balance and/or allocate storage resources of hardware devices, load balancers that distribute storage workloads across any number of hardware devices, memory for providing cache services for the hardware devices, etc.

In one or more embodiments disclosed herein, the storage (114) may be programmed to, or otherwise configured to, include the functionality to provide data storage services to the blueprint orchestrator controller (112), the blueprint orchestrator (110), and/or other entities. The data storage services may include storing of data and providing of previous stored data. The storage (114) may include the functionality to provide other and/or additional services without departing from embodiments disclosed herein. The storage (114) may store data structures including a blueprint repository (116). The storage (114) may store other and/or additional data structures without departing from embodiments disclosed herein.

In one or more embodiments disclosed herein, blueprint repository (116) may be one or more data structures that may include one or more blueprint entries associated with one or more resources executing (or to be provisioned) in the resource provider environment (140, FIG. 1A). The blueprint repository (116) may include any quantity of blueprint entries associated with any quantity of resources without departing from embodiments disclosed herein. For example, the blueprint repository (116) may include blueprint A entry (118A), blueprint B entry (118B), and blueprint N entry (118N). Each blueprint entry (118A, 118B, 118N) may include at least one blueprint (e.g., 120A), at least one prompt file (122A), and at least one answer file (124A). Each blueprint entry (118A, 118B, 118N) may be associated with a provisioned system that includes one or more resources provided by the resource provider environment (140, FIG. 1A) and may be associated with a client (e.g., 100A, FIG. 1A). The blueprint entries (118A, 118B, 118N) may include other, fewer, and/or additional components without departing from embodiments disclosed herein. For example, a blueprint entry may include multiple prompt files and multiple answer files along with a blueprint associated with multiple provisioned resources. Each of these blueprint entry components is discussed below.

In one or more embodiments, a blueprint, such as blueprint A (120), may refer to one or more data structures that includes blueprint information. The blueprint information may include a description of the provisioned system associated with the blueprint, a client identifier associated with the blueprint, a user identifier associated with the blueprint, a creation timestamp associated with the blueprint, a blueprint identifier associated with the particular blueprint, at least one answer file identifiers, and a version identifier associated with the blueprint. The blueprint information may further include a list of RP resource identifiers. Each resource identifier may be associated with a resource type and a resource provider type. Each resource identifier may be further associated with a specification file identifier and a software package identifier corresponding to a specification file and a software package included in the resource provider software repository (130, FIG. 1A). Each resource identifier may be further associated with an operation mapping.

In one or more embodiments, the operation mapping may include a mapping of generic operations to the corresponding operations in the native format of the resource provider. The generic operations may include create, read, update, delete, monitor, etc. For each resource, each of these operations may be mapped to a native API call or other operation trigger in the native format that the resource provider of the resource will recognize and initiate performance of the corresponding operation. In addition to the generic operations, the operation mapping may further include resource specific operations. These operation may include operations associated with that particular resource and not all, or none, of the other resource types. For example, if the resource is a bare metal server, the operation mappings may further include the resource specific operations of power on, power off, blink, maintenance mode, etc. Each of these resource specific operations may also be mapped to a native API call or other operation trigger in the native format that the resource provider of the resource will recognize and initiate performance of the corresponding operation.

In one or more embodiments, the blueprint information may further include lifecycle management (LCM) information associated with LCM resources. The LCM information may further include a list of LCM resource identifiers. Each LCM resource identifier may be associated with a resource type and a resource provider type. Each LCM resource identifier may be further associated with a specification file identifier and a software package identifier corresponding to a specification file and a software package included in the resource provider software repository (130, FIG. 1A). The LCM resources may include one or more LCM resource types. The LCM resource types may include, for example, telemetry collection resources, security resources, and/or upgrade resources. Each LCM resource may be associated with corresponding LCM configuration information. Additionally, the LCM configuration information may further include a mapping from a generate LCM operation to a corresponding native LCM operation for telemetry collection similar to the generic operations mappings discussed above. The generic LCM operation may be mapped to a native API call or other operation trigger in the native format that the resource provider of the resource will recognize and initiate performance of the corresponding LCM operation. The blueprint may include other and/or additional information without departing from embodiments disclosed herein.

For example, a telemetry collection LCM resource may be associated with LCM configuration information that may include a telemetry collector endpoint (e.g., Uniform Resource Locator (URL) address, Internet Protocol (IP) address, etc.), a telemetry collector identifier, telemetry collector access information (e.g., username, password, encryption key, etc.), telemetry generation schedule, a telemetry transmission schedule, and/or telemetry collector token information (e.g., a token URL). The LCM configuration information associated with the telemetry collection LCM resource may include other and/or additional information without departing from embodiments disclosed herein.

As another example, the upgrade LCM resource may be associated with LCM configuration information that may include an upgrade software bundle (e.g., images, binaries, computer instructions, etc. associated with different versions of RP resources) and a manifest file describing the RP resources and their version numbers or version identifiers. The manifest file may include a map of various possible upgrade paths for RP resources. For example, the map may specify a direct upgrade path to upgrade an RP resource from version one, to version two, to version three, etc. in a multi-step upgrade from the current version to a target version. As another example, the map may specify an indirect upgrade path to upgrade an RP resource from version one to version three in a single-step upgrade from the current version to a target version. The LCM configuration information may further include various checks (e.g., routines, processes, API calls) before and after RP resource upgrades to ensure a successful upgrades. The checks may include, for example, user profile checks to verify user information, pre-upgrade checks to verify RP resource versions, RP resource dependencies, etc., post-upgrade checks to verify proper RP resource operation. The checks may include other and/or additional types of checks associated with RP resource upgrades. Additionally, the LCM configuration information may further include pre-upgrade and/or post-upgrade hooks. The hooks may include processes, routines, API calls, etc. that execute on the occurrence of an event to send a notification to an interested RP resource, user, or other entity that indicates the occurrence of the initiation of an upgrade (pre-hook) or the occurrence of the completion of an upgrade (post-hook). The LCM configuration information associated with upgrade LCM resources may include other and/or additional information associated with RP upgrades without departing from embodiments disclosed herein.

As yet another example, the security LCM resources may provide state monitoring and remediation services for RP resources. Accordingly, the LCM configuration information associated with a security LCM resource may include RP resource information (e.g., identifiers, corresponding RP node identifiers, RP resource type, etc.), a baseline configuration of each RP resource based on content such as a support matrix of components, ecosystem configuration parameters specifying optimal performance, and security configuration parameters specifying best practices. The LCM configuration may further include drift thresholds or drift triggers for performance parameters to use to detect drift (i.e., deviation from optimal performance and/or best performance) from baseline performance which could occur as a result of a security breach, unapproved upgrades, or unapproved configuration changes. The LCM configuration information may further include security hooks notifying users of the occurrence of drifting. The security hooks may include processes, routines, API calls, etc. that execute on the occurrence of drifting to send a notification to an interested RP resource, user, or other entity that indicates the occurrence of the drifting. The LCM configuration information may further include compliance information specifying compliance requirements associated with RP resources. The LCM configuration information may further include a list of remediation actions to perform for RP resources that experience drift. The remediation actions may include restarting RP node, reverting upgraded RP resource to a previous version, spawning a new RP resource, migrating the RP resource to a new RP node, or other and/or additional actions that may be performed to remediate drifting of RP resources without departing from embodiments disclosed herein. The LCM configuration information may include other and/or additional information associated with state monitoring and remediation services associated with security LCM resources without departing from embodiments disclosed herein.

In one or more embodiments, a prompt file, such as prompt file A (122A), may refer to one or more data structures that include prompting information associated with each of the resources specified to be provisioned by a client (e.g., 100A, FIG. 1A). The prompting information may include resource identifiers, resource types, and strings prompting a user of the client to provide parameters or other information required to provision each of the resources associated with the prompt file. The prompting information may further include variable names and variable types associated with each prompt and the corresponding parameter. For example, the prompting information may include prompts for node types, node counts for each type, Classless Inter-Domain Routing (CIDR) for cluster and service, IP addresses, usernames, passwords, etc. The blueprint orchestrator may generate prompt files using prompt file templates that may be stored in the resource provider software repository (e.g., 130, FIG. 1A) and obtained by the blueprint orchestrator (110) or previously obtained by, or installed on, the blueprint orchestrator (110). The prompt file may include other and/or additional information without departing from embodiments disclosed herein.

In one or more embodiments, an answer file, such as answer file A (124A), may refer to one or more data structures that include parameter values or other information entered by a user of a client (e.g., 100A, FIG. 1A) in response to obtaining the prompt file. The answer file may include the resource identifier, the resource provider identifier, and the parameters and the corresponding parameter values associated with each resource included in the answer file. The parameters and information may include the same parameters and/or information discussed above in the prompt file. The answer file may include other and/or additional information without departing from embodiments disclosed herein.

While the data structures (e.g., 116, 118A, 118B, 118N, 120A, 122A, 124A) are illustrated or discussed throughout this Detailed Description as separate data structures and have been discussed as including a limited amount of specific information, any of the aforementioned data structures may be divided into any number of data structures, combined with any number of other data structures, and may include additional, less, and/or different information without departing from the embodiments disclosed herein. Additionally, while illustrated as being stored in the storage (114), any of the aforementioned data structures may be stored in different locations (e.g., in persistent storage of other computing devices) and/or spanned across any number of computing devices without departing from embodiments disclosed herein. The data structures of the storage (114) may be implemented using, for example, files (e.g., YAML Ain't Markup Language (YAML) files), lists, linked lists, tables, unstructured data, databases, etc. While illustrated in FIG. 1B as being stored locally, the data structures may be stored remotely and may be distributed across any number of devices without departing from embodiments disclosed herein.

Figure 1C:
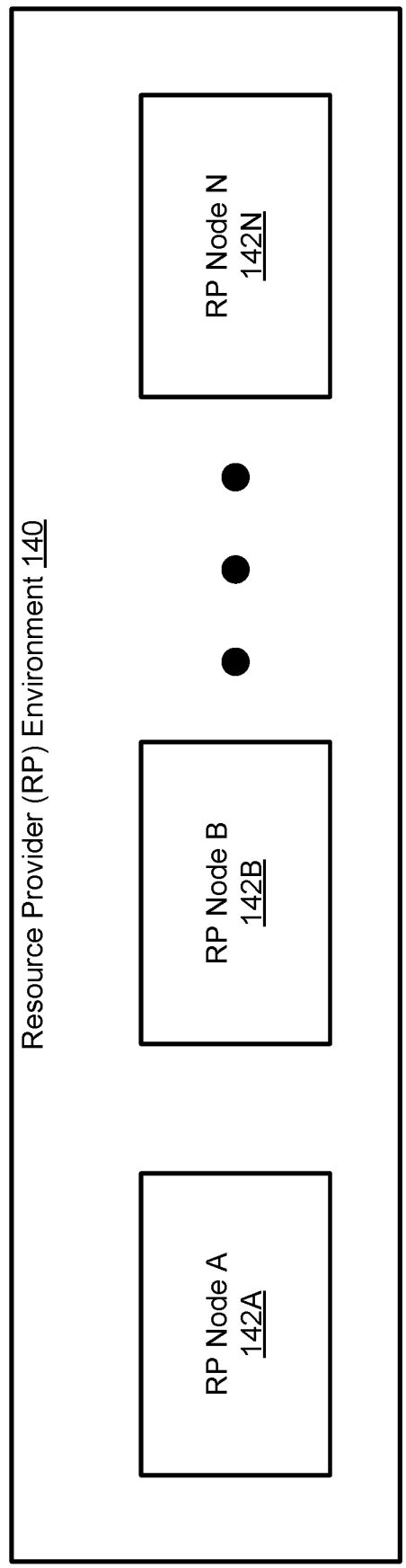
FIG. 1C shows a diagram of a resource provider environment in accordance with one or more embodiments disclosed herein.

FIG. 1C shows a diagram of a resource provider environment in accordance with one or more embodiments disclosed herein. The resource provider (RP) environment (140) may be an embodiment of the RP environment (e.g., 140, FIG. 1A) discussed above. As discussed above, the RP environment (140) may include the functionality to execute resources of resource providers as services for the clients (100, FIG. 1A). In one or more embodiments, to perform the aforementioned functionality, the RP environment (140) may include RP nodes (142A, 142B, 142N). The RP environment 140) may include any non-zero quantity of RP nodes without departing from embodiments disclosed herein. For example, the RP environment (140) may include RP node A (142A), RP node B (142B), and RP node N (142N). The RP environment (140) may include other, fewer, and/or additional components without departing from embodiments disclosed herein.

In one or more embodiments disclosed herein, the RP nodes (e.g., 142A, 142B, 142N) may be implemented using one or more computing devices. A computing device may be, for example, a mobile phone, tablet computer, laptop computer, desktop computer, server, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2A-4C. The RP nodes (e.g., 142A, 142B, 142N) may be implemented using other types of computing devices without departing from embodiments disclosed herein. For additional details regarding computing devices, refer to FIG. 5.

The RP nodes (e.g., 142A, 142B, 142N) may be implemented using logical devices without departing from embodiments disclosed herein. For example, the RP nodes (e.g., 142A, 142B, 142N) may include virtual machines that utilize computing resources of any number of physical computing devices to provide the functionality of the RP nodes (e.g., 142A, 142B, 142N). The RP nodes (e.g., 142A, 142B, 142N) may be implemented using other types of logical devices without departing from embodiments disclosed herein.

In one or more embodiments disclosed herein, the RP nodes (e.g., 142A, 142B, 142N) may be programmed to, or otherwise configured to, include the functionality to perform the resource provider services of the RP environment (140). To perform the resource provider services, each RP node (e.g., 142A) may: (i) obtain native requests from the blueprint orchestrator to provision resources or perform operations on resources executed by the RP node, (ii) execute resources as services, (iii) perform node discovery, (iv) perform primary node selection, (v) provide and/or obtain node information to and/or from other RP nodes, and/or (vi) perform resource provider operating system installations. The RP nodes (e.g., 142A, 142B, 142N) may include the functionality to perform all, or a portion, of the methods of FIGS. 2A-4C without departing from embodiments disclosed herein. For additional information regarding the functionality of the RP nodes (e.g., 142A, 142B, 142N), refer to FIGS. 2A-4C. The RP nodes (e.g., 142A, 142B, 142N) may include other and/or additional functionalities without departing from embodiments disclosed herein. For additional information regarding the RP nodes (e.g., 142A, 142B, 142N), refer to FIGS. 1E-1F.

Figure 1D:
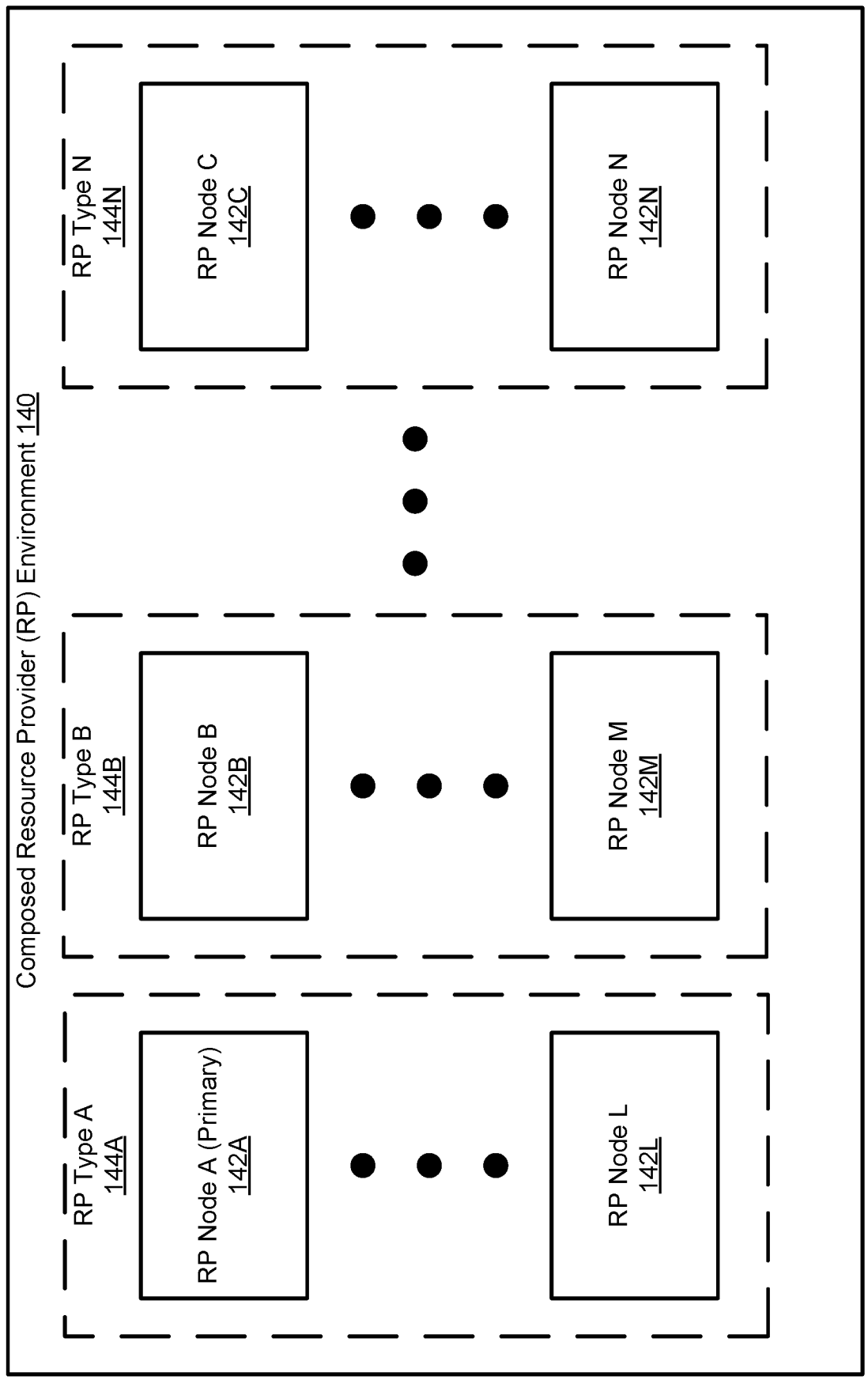
FIG. 1D shows a diagram of a composed resource provider (RP) environment in accordance with one or more embodiments disclosed herein.

FIG. 1D shows a diagram of a composed RP environment (140) in accordance with one or more embodiments disclosed herein. The composed RP environment (140) may be an embodiment of the RP environment (e.g., 140, FIG. 1A) discussed above that has been provisioned by a user of a client (e.g., 100A, FIG. 1A) associated with the composed RP environment (140) or setup by a manufacturer of the composed RP environment (140). In one or more embodiments, the RP nodes (e.g., 142A, 142B, 142C, 142L, 142M, 142N), after being manufactured and deployed (e.g., into a user's data center, made available in a public cloud, etc.), may include an initial operating system that provides the functionality to perform node discovery, primary node selection, and resource provider operating system installation. The RP nodes (e.g., 142A, 142B, 142C, 142L, 142M, 142N) may select a primary node (e.g., RP node A (142A)) to instantiate a blueprint orchestrator (e.g., 110, FIG. 1A) to provide blueprint services for the composed RP environment (140). The primary node (e.g., RP node A (142A)) may, based on a user order file (discussed below) and node information, initiate the installation of the RP operating system associated with each RP type corresponding to the user order file for each RP node (e.g., 142A, 142B, 142C, 142L, 142M, 142N). The composed RP environment (140) may include any quantity of RP types (e.g., 144A, 144B, 144N), and each RP type may include any quantity of RP nodes (e.g., 142A, 142B, 142C, 142L, 142M, 142N) without departing from embodiments disclosed herein. As a result, the flexibility of composing and recomposing composed RP environments (140) may be improved.

For example, RP node A (142A) and RP node L (142L) may install the RP operating system associated with RP type A (144A), RP node B (142B) and RP node M (142M) may install the RP operating system associated with RP type B (144B), and RP node C (142C) and RP node N (142N) may install the RP operating system associated with RP type N (144N). Accordingly RP node A (142A) and RP node L (142L) may execute RP type A (144A) resources, RP node B (142B) and RP node M (142M) may execute RP type B (144B) resources, and RP node C (142C) and RP node N (142N) may execute RP type N (144N) resources. For additional information regarding the composition of a composed RP environment (140), refer to FIGS. 4A-4C.

Figure 1E:
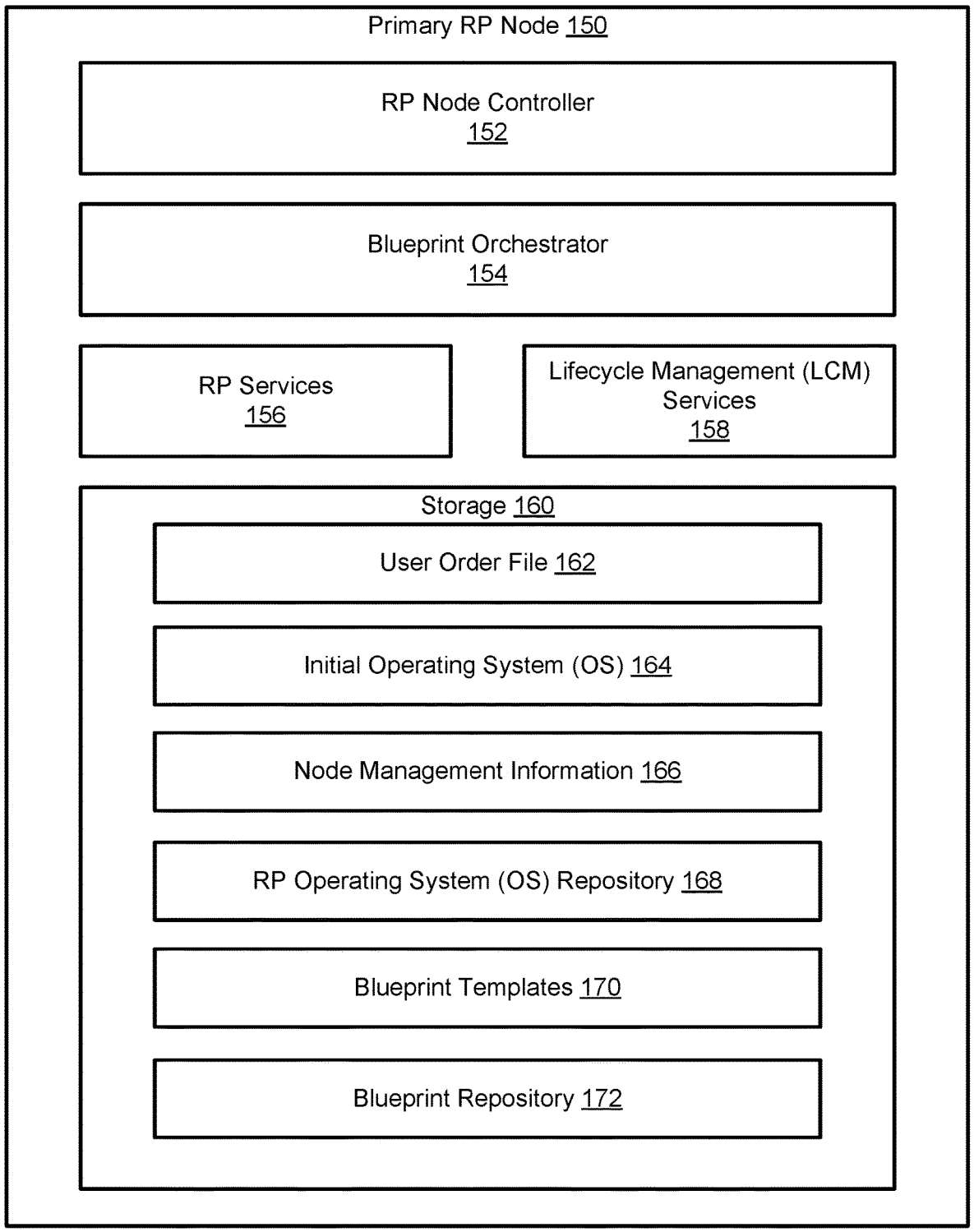
FIG. 1E shows a diagram of a primary RP node in accordance with one or more embodiments disclosed herein.

FIG. 1E shows a diagram of a primary RP node in accordance with one or more embodiments disclosed herein. The primary RP node (150) may be an embodiment of an RP node (e.g., 142A, 142B, 142C, 142L, 142M, 142N, FIG. 1D) discussed above that has been selected as the primary node. As discussed above, the primary RP node (150) may provide resource provider services that include: (i) provisioning and/or executing RP resources according to user requests and user order files, (ii) performing node discovery, (iii) performing primary node selection, (iv) performing resource provider operating system installations on RP nodes, (v) and/or providing blueprint services for the composed RP environment (140, FIG. 1D). To provide the aforementioned services, the primary RP node (150) may include an RP node controller (152), a blueprint orchestrator (154), RP services (156), lifecycle management (LCM) services (158), and storage (160). The primary RP node (150) may include other, fewer, and/or additional components without departing from embodiments disclosed herein. Each of the aforementioned components of the primary RP node (150) is discussed below.

In one or more embodiments disclosed herein, the RP node controller (152) may be implemented as a physical device. The physical device may include circuitry. The physical device may be, for example, a field-programmable gate array, application specific integrated circuit, programmable processor, microcontroller, digital signal processor, or other hardware processor. The physical device may be programmed or otherwise configured to provide the functionality of the RP node controller (152) described throughout this Detailed Description.

In one or more embodiments disclosed herein, the RP node controller (152) may be implemented as computer instructions, e.g., computer code, stored on a storage that when executed by a processor of the primary RP node (150) causes the primary RP node (150) to provide the functionality of the RP node controller (152) described throughout this Detailed Description.

In one or more embodiments disclosed herein, the RP node controller (152) may include the functionality to provide the resource provider services of the primary RP node (150). The RP node controller (152) may: (i) provision and/or execute RP resources and LCM resources according to user requests and user order files, (ii) perform node discovery, and/or (iii) perform primary node selection, and/or (iv) perform resource provider operating system installations on other RP nodes. The RP node controller (152) may include other and/or additional functionality without departing from embodiments disclosed herein.

In one or more embodiments disclosed herein, the blueprint orchestrator (154) may be implemented as a physical device. The physical device may include circuitry. The physical device may be, for example, a field-programmable gate array, application specific integrated circuit, programmable processor, microcontroller, digital signal processor, or other hardware processor. The physical device may be programmed or otherwise configured to provide the functionality of the blueprint orchestrator (154) described throughout this Detailed Description.

In one or more embodiments disclosed herein, the blueprint orchestrator (154) may be implemented as computer instructions, e.g., computer code, stored on a storage (e.g., 160) that when executed by a processor of the primary RP node (150) causes the primary RP node (150) to provide the functionality of the blueprint orchestrator (154) described throughout this Detailed Description.

In one or more embodiments disclosed herein, the blueprint orchestrator (154) may include the functionality to perform blueprint services. The blueprint orchestrator (154) may be an embodiment of the blueprint orchestrator (110, FIG. 1B) discussed above. For additional information regarding the blueprint orchestrator (154), refer to FIG. 1B. The blueprint orchestrator (154) may include other and/or additional functionality without departing from embodiments disclosed herein.

In one or more embodiments disclosed herein, the RP services (156) may be implemented as computer instructions, e.g., computer code, stored on a storage (e.g., 160) that when executed by a processor of the primary RP node (150) causes the primary RP node (150) to provide the functionality of the RP services (156) described throughout this Detailed Description.

In one or more embodiments, the RP services (156) may provide the functionality of one or more RP resources executing on the primary RP node (150). The RP services may be associated with a particular RP type and executed using the RP operating system associated with the RP type that is installed on the primary RP node (150). The RP services (156) may include, for example, container management services, bare metal server management services, compute node services, storage node services, etc. The RP services may include other and/or additional types of services associated with resource providers. The RP services (156) may include or provide other and/or additional functionalities without departing from embodiments disclosed herein.

In one or more embodiments disclosed herein, the LCM services (158) may be implemented as computer instructions, e.g., computer code, stored on a storage (e.g., 160) that when executed by a processor of the primary RP node (150) causes the primary RP node (150) to provide the functionality of the LCM services (158) described throughout this Detailed Description.

In one or more embodiments, the LCM services (158) may provide the functionality of one or more LCM resources executing on the primary RP node (150). The LCM services may be associated with a particular RP type and executed using the RP operating system associated with the RP type that is installed on the primary RP node (150). The LCM services may include, for example, telemetry collection services, security services, upgrade services, etc. The LCM services (158) may include other and/or additional types of services associated with the LCM of resource providers. The LCM services (158) may include or provide other and/or additional functionalities without departing from embodiments disclosed herein.

In one or more embodiments disclosed herein, the storage (160) may be implemented using a storage device. The storage device may be implemented using physical storage devices and/or logical storage devices. The storage (160) may be implemented using other types of devices that provide data storage services without departing from the embodiments disclosed herein.

A logical storage device may be an entity that utilizes the physical storage devices of one or more computing devices to provide data storage services. For example, a logical storage may be a virtualized storage that utilizes any quantity of storage resources (e.g., physical storage devices) of any number of computing devices.

A physical storage device may be a physical device that provides data storage services. For example, a physical storage device may include any number of physical devices such as, for example, hard disk drives, solid state drives, tape drives, and/or other types of hardware devices that store data. The physical storage device may include any number of other types of hardware devices for providing data storage services. For example, the physical storage device may include storage controllers that balance and/or allocate storage resources of hardware devices, load balancers that distribute storage workloads across any number of hardware devices, memory for providing cache services for the hardware devices, etc.

In one or more embodiments disclosed herein, the storage (160) may be programmed to, or otherwise configured to, include the functionality to provide data storage services to the primary RP node (150), the RP node controller (152), the blueprint orchestrator (154), the RP services (156), the LCM services (158), and/or other entities. The data storage services may include storing of data and providing of previous stored data. The storage (160) may include the functionality to provide other and/or additional services without departing from embodiments disclosed herein. The storage (160) may store data structures including a user order file (162), an initial operating system (OS) (164), node management information (166), an RP operating system (OS) repository (168), blueprint templates (170), and a blueprint repository (172). The storage (160) may store other and/or additional data structures without departing from embodiments disclosed herein.

In one or more embodiments disclosed herein, a user order file (162) may refer to one or more data structures that include user order information. In one or more embodiments, a user of a client (e.g., 100A, FIG. 1A) may order, reserve, deploy, or otherwise obtain the RP environment and the RP nodes included in the RP environment. The user order file may specify user order information associated with the RP environment. The user order information may include a user identifier, a client identifier, client communication information (e.g., IP address, URL address, encryption keys, passwords, etc.) the number of RP nodes associated with the user, the one or more resource providers (e.g., resource provider types) associated with the user, and/or the one or more RP resources and corresponding RP resource types associated with each of the one or more resource providers. The user information may include other and/or additional information without departing from embodiments disclosed herein. A copy of the user order file may be installed or uploaded to each RP node in the RP environment. The primary RP node (150) may use the user order file to install one or more RP operating systems on the RP nodes (including the primary RP node itself) in the RP environment and provision one or more RP resources and/or LCM resources on the RP nodes (including the primary RP node itself). In one or more embodiments disclosed herein, the user order file (162) may include other and/or additional information without departing from embodiments disclosed herein.

In one or more embodiments disclosed herein, the initial OS (164) may refer to a one or more data structures that include computer programs or computer instructions that may execute on the underlying hardware of the primary RP node (150). Specifically, the initial OS (164) may be designed and configured to perform initial primary RP node (150) operations. To that extent, the initial OS (164) may include functionality to perform node discovery and primary node selection functions. The initial OS (164) may include other functionalities such as, for example, supporting fundamental primary RP node (150) functions; schedule tasks; mediate interactivity between logical (e.g., software) and physical (e.g., hardware) primary RP node (150) components; allocate primary RP node (150) resources; and execute or invoke other computer programs or services executing on the primary RP node (150). The initial OS (164) may be installed in the storage (160) by, for example, the primary RP node (150) manufacturer during manufacturing or deployment of the primary RP node (150). The initial OS (164) may perform other and/or additional functionalities without departing from the embodiments disclosed herein.

In one or more embodiments disclosed herein, the node management information (166) may include information associated with the RP nodes in the RP environment. The information may include, for example, a list of RP node identifiers, RP node types associated with each RP node, and RP node contact information (e.g., URL address, IP address, passwords, encryption keys, etc.). The node management information (166) may be obtained from each RP node by the primary RP node (150) during node discovery and primary node selection. The node management information (166) may be used to communicate with other nodes, install RP operating systems on other nodes, and send operation requests to other nodes. The node management information (166) may include other and/or additional information associated with the RP nodes of the RP environment without departing from embodiments disclosed herein.

In one or more embodiments disclosed herein, RP OS repository (168) may be one or more data structures that may include RP operating systems associated with each type of RP associated with the RP environment. Each RP OS in the RP OS repository may be stored in the storage (160) by, for example, the primary RP node (150) manufacturer during manufacturing or deployment of the primary RP node (150). Each RP OS may later be installed, uninstalled, or reinstalled on the primary RP node (150) depending on the RP types allocated to the primary RP node based on user requests such that the RP OS may begin executing on the hardware of the primary RP node (150). Each RP OS may be associated with its own corresponding native API calls or other operation triggers. Each RP OS may include computer programs or computer instructions that may execute on the underlying hardware of the primary RP node (150). Specifically, each RP OS may be designed and configured to perform RP services of the primary RP node (150). To that extent, each RP OS may include functionality to execute and manage RP services and LCM services and perform RP operations on RP services and LCM operations on LCM services associated with the RP OS. Each RP OS may include other functionalities such as, for example, supporting fundamental primary RP node (150) functions; schedule tasks; mediate interactivity between logical (e.g., software) and physical (e.g., hardware) primary RP node (150) components; allocate primary RP node (150) resources; and execute or invoke other computer programs or services executing on the primary RP node (150). Each RP OS of the RP OS repository (168) may perform other and/or additional functionalities without departing from the embodiments disclosed herein. The RP OS repository (168) may include other and/or additional information without departing from embodiments disclosed herein.

In one or more embodiments disclosed herein, blueprint templates (170) may be one or more data structures that include partial blueprints associated with one or more RP resources and/or LCM resources provided by each RP type. The partial blueprints may include, for example, resource types and a resource provider type associated with each blueprint. Each resource type may be further associated with a specification file identifier and a software package identifier corresponding to a specification file and a software package included in the resource provider software repository (130, FIG. 1A) that is associated with that resource type. The partial blueprints may further include the operation mappings associated with each resource type. In addition to the partial blueprints, the blueprint templates (170) may further include prompt files associated with each resource type of each RP type. The blueprint templates (170) may be used by the blueprint orchestrator (154) to generate blueprints. The blueprint templates may be stored in the storage (160) by, for example, the primary RP node (150) manufacturer during manufacturing or deployment of the primary RP node (150). The blueprint templates (170) may include other and/or additional information without departing from embodiments disclosed herein.

In one or more embodiments disclosed herein, the blueprint repository (172) may be an embodiment of the blueprint repository (116, FIG. 1B) discussed above. For additional information regarding the blueprint repository (172), refer to FIG. 1B.

While the data structures (e.g., 162, 164, 166, 168, 170, 172) are illustrated or discussed throughout this Detailed Description as separate data structures and have been discussed as including a limited amount of specific information, any of the aforementioned data structures may be divided into any number of data structures, combined with any number of other data structures, and may include additional, less, and/or different information without departing from the embodiments disclosed herein. Additionally, while illustrated as being stored in the storage (160), any of the aforementioned data structures may be stored in different locations (e.g., in persistent storage of other computing devices) and/or spanned across any number of computing devices without departing from embodiments disclosed herein. The data structures of the storage (160) may be implemented using, for example, files (e.g., YAML Ain't Markup Language (YAML) files), lists, linked lists, tables, unstructured data, databases, etc. While illustrated in FIG. 1E as being stored locally, the data structures may be stored remotely and may be distributed across any number of devices without departing from embodiments disclosed herein.

Figure 1F:
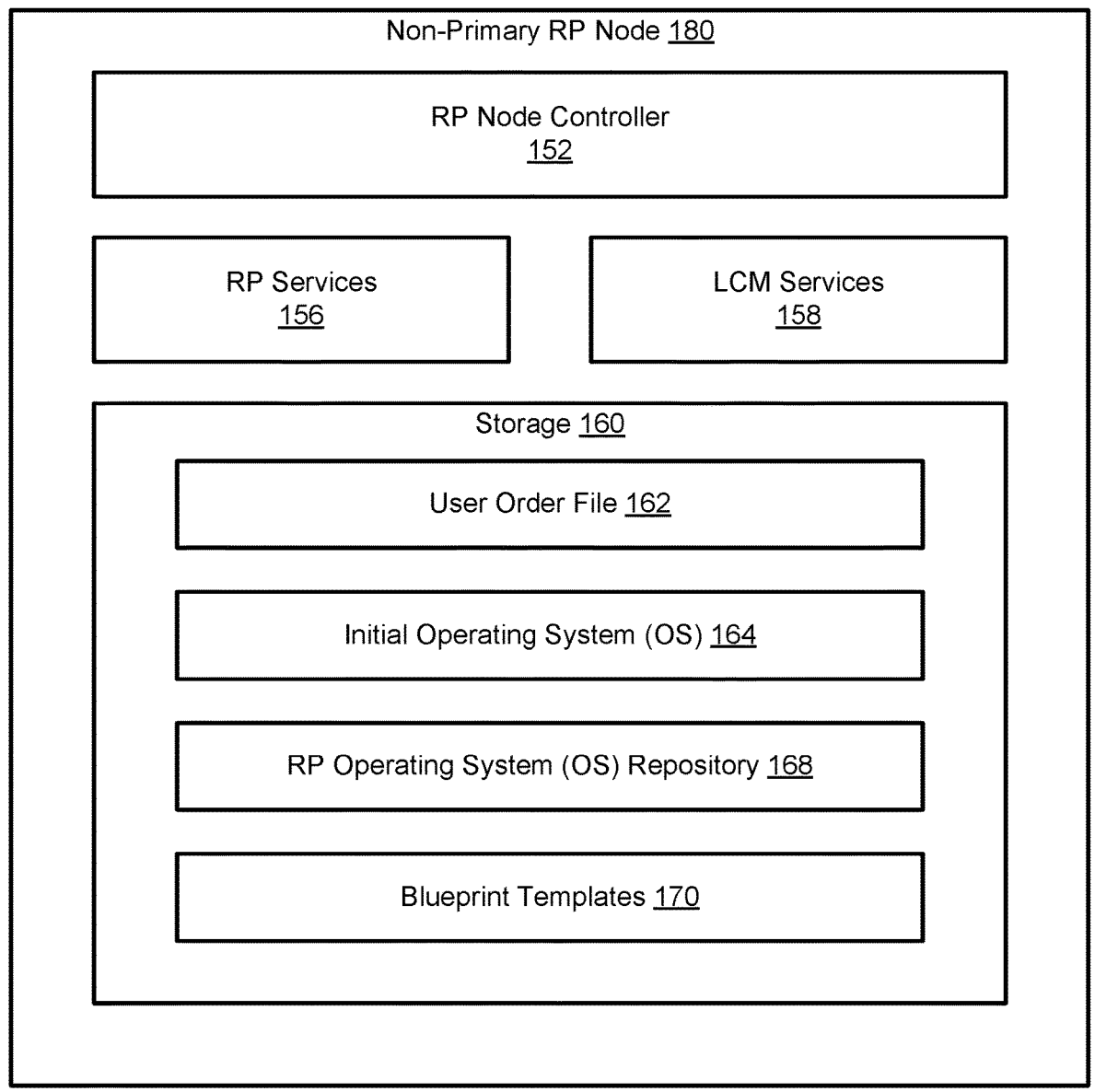
FIG. 1F shows a diagram of a non-primary RP node in accordance with one or more embodiments disclosed herein.

FIG. 1F shows a diagram of a non-primary RP node in accordance with one or more embodiments disclosed herein. The non-primary RP node (180) may be an embodiment of an RP node (e.g., 142A, 142B, 142C, 142L, 142M, 142N, FIG. 1D) discussed above that has not been selected as the primary node. As discussed above, the non-primary RP node (180) may provide resource provider services that include: (i) provisioning and/or executing RP resources according to user requests and user order files, (ii) performing node discovery, and/or (iii) performing primary node selection. To provide the aforementioned services, the non-primary RP node (180) may include an RP node controller (152), RP services (156), lifecycle management (LCM) services (158), and storage (160). The non-primary RP node (180) may include other, fewer, and/or additional components without departing from embodiments disclosed herein. Each of the aforementioned components of the non-primary RP node (180) is discussed below.

In one or more embodiments disclosed herein, the RP node controller (152) may be implemented as a physical device. The physical device may include circuitry. The physical device may be, for example, a field-programmable gate array, application specific integrated circuit, programmable processor, microcontroller, digital signal processor, or other hardware processor. The physical device may be programmed or otherwise configured to provide the functionality of the RP node controller (152) described throughout this Detailed Description.

In one or more embodiments disclosed herein, the RP node controller (152) may be implemented as computer instructions, e.g., computer code, stored on a storage that when executed by a processor of the non-primary RP node (180) causes the non-primary RP node (180) to provide the functionality of the RP node controller (152) described throughout this Detailed Description.

In one or more embodiments disclosed herein, the RP node controller (152) may include the functionality to provide the resource provider services of the non-primary RP node (180). The RP node controller (152) may: (i) provision and/or execute RP resources and LCM resources according to user requests and user order files, (ii) perform node discovery, and/or (iii) perform primary node selection, and/or (iv) perform resource provider operating system installations on other RP nodes. The RP node controller (152) may include other and/or additional functionality without departing from embodiments disclosed herein.

In one or more embodiments disclosed herein, the RP services (156) may be implemented as computer instructions, e.g., computer code, stored on a storage (e.g., 160) that when executed by a processor of the non-primary RP node (180) causes the non-primary RP node (180) to provide the functionality of the RP services (156) described throughout this Detailed Description.

In one or more embodiments, the RP services (156) may provide the functionality of one or more RP resources executing on the non-primary RP node (180). The RP services may be associated with a particular RP type and executed using the RP operating system associated with the RP type that is installed on the non-primary RP node (180). The RP services (156) may include, for example, container management services, bare metal server management services, compute node services, storage node services, etc. The RP services may include other and/or additional types of services associated with resource providers. The RP services (156) may include or provide other and/or additional functionalities without departing from embodiments disclosed herein.

In one or more embodiments disclosed herein, the LCM services (158) may be implemented as computer instructions, e.g., computer code, stored on a storage (e.g., 160) that when executed by a processor of the non-primary RP node (180) causes the non-primary RP node (180) to provide the functionality of the LCM services (158) described throughout this Detailed Description.

In one or more embodiments, the LCM services (158) may provide the functionality of one or more LCM resources executing on the non-primary RP node (180). The LCM services may be associated with a particular RP type and executed using the RP operating system associated with the RP type that is installed on the non-primary RP node (180). The LCM services may include, for example, telemetry collection services, security services, upgrade services, etc. The LCM services (158) may include other and/or additional types of services associated with the LCM of resource providers. The LCM services (158) may include or provide other and/or additional functionalities without departing from embodiments disclosed herein.

In one or more embodiments disclosed herein, the storage (160) may be implemented using a storage device. The storage device may be implemented using physical storage devices and/or logical storage devices. The storage (160) may be implemented using other types of devices that provide data storage services without departing from the embodiments disclosed herein.

A logical storage device may be an entity that utilizes the physical storage devices of one or more computing devices to provide data storage services. For example, a logical storage may be a virtualized storage that utilizes any quantity of storage resources (e.g., physical storage devices) of any number of computing devices.

A physical storage device may be a physical device that provides data storage services. For example, a physical storage device may include any number of physical devices such as, for example, hard disk drives, solid state drives, tape drives, and/or other types of hardware devices that store data. The physical storage device may include any number of other types of hardware devices for providing data storage services. For example, the physical storage device may include storage controllers that balance and/or allocate storage resources of hardware devices, load balancers that distribute storage workloads across any number of hardware devices, memory for providing cache services for the hardware devices, etc.

In one or more embodiments disclosed herein, the storage (160) may be programmed to, or otherwise configured to, include the functionality to provide data storage services to the non-primary RP node (180), the RP node controller (152), the RP services (156), the LCM services (158), and/or other entities. The data storage services may include storing of data and providing of previous stored data. The storage (160) may include the functionality to provide other and/or additional services without departing from embodiments disclosed herein. The storage (160) may store data structures including a user order file (162), an initial operating system (OS) (164), node management information (166), an RP operating system (OS) repository (168), and blueprint templates (170). The storage (160) may store other and/or additional data structures without departing from embodiments disclosed herein.

In one or more embodiments disclosed herein, a user order file (162) may refer to one or more data structures that include user order information. In one or more embodiments, a user of a client (e.g., 100A, FIG. 1A) may order, reserve, or otherwise obtain the RP environment and the RP nodes included in the RP environment. The user order file may specify user order information associated with the RP environment. The user order information may include a user identifier, a client identifier, the number of RP nodes associated with the user, the one or more resource providers (e.g., resource provider types) associated with the user, and/or the one or more RP resources associated with each of the one or more resource providers. The user information may include other and/or additional information without departing from embodiments disclosed herein. A copy of the user order file may be installed or uploaded to each RP node in the RP environment. The primary RP node (150, FIG. 1E) may use the user order file to install one or more RP operating systems on the RP nodes (including the primary RP node itself) in the RP environment and provision one or more RP resources and/or LCM resources on the RP nodes (including the primary RP node itself). The non-primary RP node (180) may ignore the user order file (162) unless it is chosen as the primary node in a subsequent primary node selection. In one or more embodiments disclosed herein, the user order file (162) may include other and/or additional information without departing from embodiments disclosed herein.

In one or more embodiments disclosed herein, the initial OS (164) may refer to a one or more data structures that include computer programs or computer instructions that may execute on the underlying hardware of the non-primary RP node (180). Specifically, the initial OS (164) may be designed and configured to perform initial non-primary RP node (180) operations. To that extent, the initial OS (164) may include functionality to perform node discovery and primary node selection functions. The initial OS (164) may include other functionalities such as, for example, supporting fundamental non-primary RP node (180) functions; schedule tasks; mediate interactivity between logical (e.g., software) and physical (e.g., hardware) non-primary RP node (180) components; allocate non-primary RP node (180) resources; and execute or invoke other computer programs or services executing on the non-primary RP node (180). The initial OS (164) may be installed in the storage (160) by, for example, the non-primary RP node (180) manufacturer during manufacturing or deployment of the non-primary RP node (180). The initial OS (164) may perform other and/or additional functionalities without departing from the embodiments disclosed herein.

In one or more embodiments disclosed herein, RP OS repository (168) may be one or more data structures that may include RP operating systems associated with each type of RP associated with the RP environment. Each RP OS in the RP OS repository may be stored in the storage (160) by, for example, the non-primary RP node (180) manufacturer during manufacturing or deployment of the non-primary RP node (180). Each RP OS may later be installed, uninstalled, or reinstalled on the non-primary RP node (180) depending on the RP types allocated to the non-primary RP node (180) based on user requests such that the RP OS may begin executing on the hardware of the non-primary RP node (180). Each RP OS may be associated with its own corresponding native API calls or other operation triggers. Each RP OS may include computer programs or computer instructions that may execute on the underlying hardware of the non-primary RP node (180). Specifically, each RP OS may be designed and configured to perform RP services of the non-primary RP node (180). To that extent, each RP OS may include functionality to execute and manage RP services and LCM services and perform RP operations on RP services and LCM operations on LCM services associated with the RP OS. Each RP OS may include other functionalities such as, for example, supporting fundamental non-primary RP node (180) functions; schedule tasks; mediate interactivity between logical (e.g., software) and physical (e.g., hardware) non-primary RP node (180) components; allocate non-primary RP node (180) resources; and execute or invoke other computer programs or services executing on the non-primary RP node (180). Each RP OS of the RP OS repository (168) may perform other and/or additional functionalities without departing from the embodiments disclosed herein. The RP OS repository (168) may include other and/or additional information without departing from embodiments disclosed herein.

In one or more embodiments disclosed herein, blueprint templates (170) may be one or more data structures that include partial blueprints associated with one or more RP resources and/or LCM resources provided by each RP type. The partial blueprints may include, for example, resource types and a resource provider type associated with each blueprint. Each resource type may be further associated with a specification file identifier and a software package identifier corresponding to a specification file and a software package included in the resource provider software repository (130, FIG. 1A) that is associated with that resource type. The partial blueprints may further include the operation mappings associated with each resource type. In addition to the partial blueprints, the blueprint templates (170) may further include prompt files associated with each resource type of each RP type. The blueprint templates (170) may be used by the blueprint orchestrator (154, FIG. 1E) of the primary RP node (150, FIG. 1E) to generate blueprints. The non-primary RP node (180) may ignore the user order file (162) unless it is chosen as the primary node in a subsequent primary node selection. The blueprint templates may be stored in the storage (160) by, for example, the non-primary RP node (180) manufacturer during manufacturing or deployment of the non-primary RP node (180). The blueprint templates (170) may include other and/or additional information without departing from embodiments disclosed herein.

While the data structures (e.g., 162, 164, 168, 170) are illustrated or discussed throughout this Detailed Description as separate data structures and have been discussed as including a limited amount of specific information, any of the aforementioned data structures may be divided into any number of data structures, combined with any number of other data structures, and may include additional, less, and/or different information without departing from the embodiments disclosed herein. Additionally, while illustrated as being stored in the storage (160), any of the aforementioned data structures may be stored in different locations (e.g., in persistent storage of other computing devices) and/or spanned across any number of computing devices without departing from embodiments disclosed herein. The data structures of the storage (160) may be implemented using, for example, files (e.g., YAML Ain't Markup Language (YAML) files), lists, linked lists, tables, unstructured data, databases, etc. While illustrated in FIG. 1E as being stored locally, the data structures may be stored remotely and may be distributed across any number of devices without departing from embodiments disclosed herein.

Figure 2A:
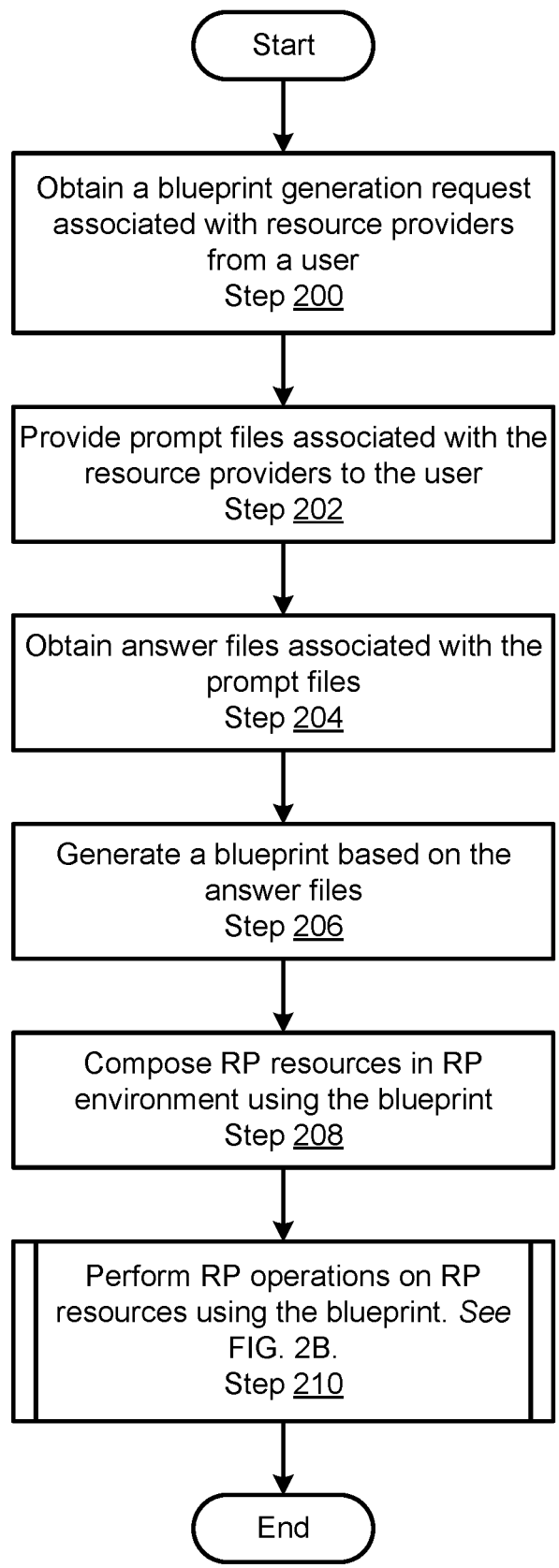
FIG. 2A shows a flowchart of a method for composing resource provider resources using a blueprint in accordance with one or more embodiments disclosed herein.

FIG. 2A shows a flowchart of a method for composing resource provider resources using a blueprint in accordance with one or more embodiments disclosed herein. The method may be performed by, for example, a blueprint orchestrator (e.g., 110, FIG. 1A). Other and/or additional components of the system illustrated in FIGS. 1A-1F may perform all, or a portion, of the method of FIG. 2A without departing from embodiments disclosed herein.

While FIG. 2A is illustrated as a series of steps, any of the steps may be omitted, performed in a different order, additional steps may be included, and/or any or all of the steps may be performed in a parallel and/or partially overlapping manner without departing from embodiments disclosed herein.

In step 200, a blueprint generation request associated with resource providers is obtained.

In one or more embodiments disclosed herein, the blueprint orchestrator may obtain the blueprint generation request from a client. The user of the client may generate the blueprint generation request. The blueprint generation request may include the RP types associated with the resource providers corresponding to the request, a list of one or more RP resources identifiers associated with each RP types, and RP resource types associated with each RP resource identifier corresponding to RP resources to be included in the blueprint. The blueprint generation request may include user information such as a user identifier, a client identifier, a client communication information (e.g., a URL address, an IP address, a username and password, encryption keys, etc.). The blueprint generation request may include other and/or additional information without departing from embodiments disclosed herein. The client may send the blueprint generation request using any appropriate method of data transmission without departing from embodiments disclosed herein. For example, the client may send the blueprint generation request as a message that includes one or more packets through one or more network devices that operatively connect the client to the blueprint orchestrator. The blueprint generation request associated with resource providers may be obtained by the blueprint orchestrator from the client via other and/or additional methods without departing from embodiments disclosed herein.

In step 202, prompt files associated with the resource providers are provided to the user.

In one or more embodiments disclosed herein, the blueprint orchestrator may generate prompt files for each resource of the resource providers specified in the blueprint generation request using prompt file templates associated with each resource type in the resource provider software repository. The blueprint orchestrator may include the resource identifiers and the corresponding user information and client information in each prompt file template to generate the prompt files. After generating the prompt files, the blueprint orchestrator may provide the prompt files to the client used by the user. The blueprint orchestrator may provide the prompt files to the client using any appropriate method of data transmission without departing from embodiments disclosed herein. For example, the blueprint orchestrator may send the prompt files as one or more messages that include one or more packets through one or more network devices that operatively connect the client to the blueprint orchestrator. The prompt files associated with the resource providers may be provided to the user via other and/or additional methods without departing from embodiments disclosed herein.

In step 204, answer files associated with the prompt files are obtained.

In one or more embodiments disclosed herein, in response to obtaining the prompt files, the user may generate answer files. The user may, through a user interface (e.g., a graphical user interface, a command-line interface, etc.) of the client, input the variables in the prompt files to generate the answer files. After the answer files are generated, the client may provide the answer files to the blueprint orchestrator. The client may send the answer files using any appropriate method of data transmission without departing from embodiments disclosed herein. For example, the client may send the answer files as one or more messages that include one or more packets through one or more network devices that operatively connect the client to the blueprint orchestrator. The answer files associated with the prompt files may be obtained by the blueprint orchestrator from the client via other and/or additional methods without departing from embodiments disclosed herein.

In step 206, a blueprint is generated based on the answer files.

In one or more embodiments disclosed herein, the blueprint orchestrator generates a blueprint based on the answer files. The blueprint orchestrator may include a list of resources and their corresponding resource identifiers and RP types in the blueprint. The blueprint orchestrator may include the specification file identifier and the software package identifier associated with each resource. The blueprint orchestrator may also include the parameters included in the corresponding answer file for each resource in the blueprint. The blueprint orchestrator may further include the operation mappings associated with each resource in the blueprint. The blueprint orchestrator may provide a copy of a portion of the blueprint information (e.g., blueprint identifiers, RP resource identifiers, etc.) included in the blueprint to the client and/or user of the client to enable the client and/or the user to submit generic requests associated with the RP resources corresponding to the blueprint. The blueprint may be generated based on the answer files via other and/or additional methods without departing from embodiments disclosed herein.

In step 208, RP resources are composed in the RP environment using the blueprint.

In one or more embodiments, the blueprint orchestrator may send native RP creation requests for each resource specified in the blueprint to RP nodes of the RP environment. The creation requests may be mapped to the native RP format associated with the RP type corresponding to each resource using the operation mappings associated with each resource in the blueprint. The blueprint orchestrator may also provide parameters associated with each resource. The native RP format requests may be obtained by RP nodes that are associated with the RP type (e.g., executing the RP OS associated with the RP type). In response to obtaining the requests, the RP nodes may instantiate resources and begin executing RP services that implement the resources using the specification files and the software packages associated with the resources in the resource provider software repository. The RP nodes may obtain the specification files and the software packages associated with the resources directly from the resource provider software repository or the specification files and the software packages may be indirectly obtained from the blueprint orchestrator. The RP resources may be composed in the RP environment using the blueprint via other and/or additional methods without departing from embodiments disclosed herein.

In step 210, RP operations are performed on RP resources using the blueprint.

Figure 2B:
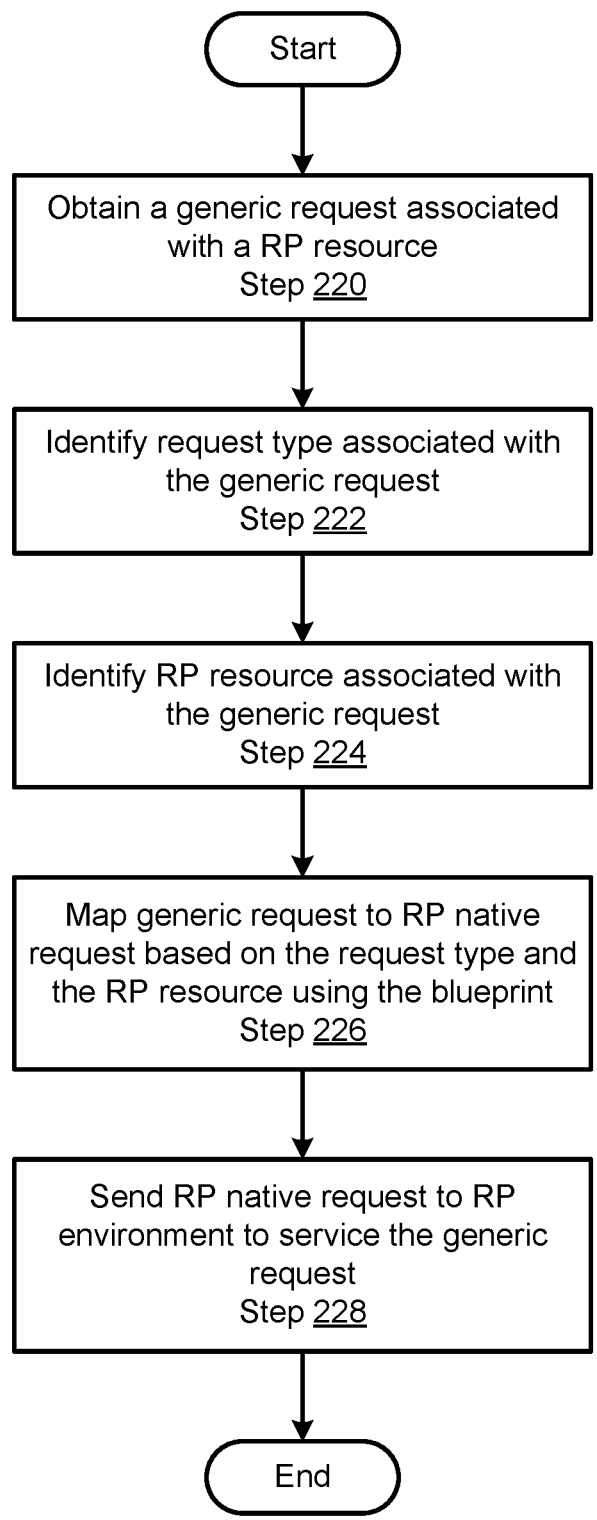
FIG. 2B shows a flowchart of a method for performing RP operations on RP resources in an RP environment in accordance with one or more embodiments disclosed herein.

In one or more embodiments disclosed herein, the blueprint orchestrator may facilitate the performance of RP operations on the RP resources using the blueprint via the methods discussed in FIG. 2B. For additional information regarding the performance of RP operation on the RP resources using the blueprint, refer to FIG. 2B. RP operations may be performed on RP resources using the blueprint via other and/or additional methods without departing from embodiments disclosed herein.

In one or more embodiments disclosed herein, the method may end following step 210.

FIG. 2B shows a flowchart of a method for performing RP operations on RP resources in an RP environment in accordance with one or more embodiments disclosed herein. The method may be performed by, for example, a blueprint orchestrator (e.g., 110, FIG. 1A). Other and/or additional components of the system illustrated in FIGS. 1A-1F may perform all, or a portion, of the method of FIG. 2B without departing from embodiments disclosed herein.

While FIG. 2B is illustrated as a series of steps, any of the steps may be omitted, performed in a different order, additional steps may be included, and/or any or all of the steps may be performed in a parallel and/or partially overlapping manner without departing from embodiments disclosed herein.

In step 220, a generic request associated with a RP resource is obtained.

In one or more embodiments disclosed herein, the blueprint orchestrator may obtain the generic request from a client. The user of the client may generate the generic request. The generic request may include the blueprint identifier associated with the blueprint that corresponds to the generic request. The blueprint orchestrator may identify the blueprint associated with the generic request using the blueprint identifier to use the blueprint in the subsequent steps of this method. The generic request may further include the request type and may specify the one or more RP resources associated with the generic request. The generic request may include other and/or additional information without departing from embodiments disclosed herein. The client may send the generic request using any appropriate method of data transmission without departing from embodiments disclosed herein. For example, the client may send the generic request as a message that includes one or more packets through one or more network devices that operatively connect the client to the blueprint orchestrator. The generic request associated with an RP resource may be obtained by the blueprint orchestrator from the client via other and/or additional methods without departing from embodiments disclosed herein.

In step 222, a request type associated with the generic request is identified.

As discussed above, the generic operations may be performed on each RP resource. Also as discussed above, the generic request may include the request type associated with the generic request. The blueprint orchestrator may parse the request to obtain the request type associated with the generic request. In one or more embodiments disclosed herein, the blueprint orchestrator may compare the request type included in the generic request with the list of generic request types included in the blueprint. The blueprint orchestrator may identify the matching request type as the request type associated with the generic request. The request type associated with the generic request may be identified via other and/or additional methods without departing from embodiments disclosed herein.

In step 224, an RP resource associated with the generic request is identified.

As discussed above, the generic request may specify one or more RP resources associated with the generic request. In one embodiment, the generic request may include one or more RP resource identifiers associated with the one or more RP resources targeted by the generic request. In such embodiments, the blueprint orchestrator may parse the generic request to identify the one or more RP resource identifiers included in the generic requests. The blueprint orchestrator may then match the one or more RP resource identifiers included in the generic request with one or more RP resource identifiers included in the blueprint to identify the RP resource or RP resources associated with the generic request.

In another embodiment, the generic request may include one or more RP resource types associated with RP resources targeted by the generic request. In such embodiments, the blueprint orchestrator may parse the generic request to identify the one or more RP resource types included in the generic requests. The blueprint orchestrator may then match the one or more RP resource types included in the generic request with one or more RP resource types included in the blueprint. The blueprint orchestrator may then identify all RP resources associated with the RP resource types as RP resources associated with the generic request.

In yet another embodiment, the generic request may be associated with all the RP resources associated with the blueprint. The generic request may include a parameter, tag, command, or other indicator that may specify that the generic request is associated with all RP resources. In such embodiments, the blueprint orchestrator may parse the generic request to identify the parameter, tag, command, or other indicator that specifies that the generic request is associated with all RP resources. The blueprint orchestrator may then identify all RP resources associated with the blueprint as RP resources associated with the generic request. The RP resource associated with the generic request may be identified via other and/or additional methods without departing from embodiments disclosed herein.

In step 226, the generic request is mapped to an RP native request based on the request type and the RP resource using the blueprint.

In one or more embodiments disclosed herein, the blueprint orchestrator may then map the generic request to an RP native request based on the request type and the RP resource using the blueprint. For each RP resource associated with the generic request, the blueprint orchestrator may map the generic request type to the corresponding RP native request using the request mappings in the blueprint associated with the RP resource. The blueprint orchestrator may include information required to perform the RP native request such as, for example, the RP resource identifier. The generic request may be mapped to an RP native request based on the request type and the RP resource using the blueprint via other and/or additional methods without departing from the embodiments disclosed herein.

In step 228, the RP native request is sent to RP environment to service the generic request.

In one or more embodiments disclosed herein, the blueprint orchestrator may provide the RP native request to the RP environment for each RP resource associated with the generic request. For each RP resource, the blueprint orchestrator may provide the RP native request to one or more RP nodes associated with the RP type corresponding to the RP resource. The RP node associated with RP resource may obtain the RP native request. In response to obtaining the RP native request, the RP node may perform the RP native request on the RP resource associated with the RP native request. The blueprint orchestrator may send the native RP requests using any appropriate method of data transmission without departing from embodiments disclosed herein. For example, the blueprint orchestrator may send the native RP requests as messages that include one or more packets through one or more network devices that operatively connect the RP nodes to the blueprint orchestrator.

After performing the RP native request, the RP node may provide a response to the blueprint orchestrator and/or the client (e.g., directly or indirectly through the blueprint orchestrator) associated with the generic request. For example, the response may include a notification the request has been performed, information resulting from the execution of the RP native request (e.g., a list of RP resources associated with a read request, RP resource information associated with a creation request, etc.), or other and/or additional information associated with the execution of RP native requests without departing from embodiments disclosed herein. The RP node may send response using any appropriate method of data transmission without departing from embodiments disclosed herein. For example, the RP node may send the responses as messages that include one or more packets through one or more network devices that operatively connect the RP nodes to the blueprint orchestrator and/or the client. The RP native request may be sent to RP environment to service the generic request via other and/or additional methods without departing from embodiments disclosed herein.

In one or more embodiments disclosed herein, the method may end following step 228.

By performing the methods of FIG. 2A and FIG. 2B, a user may compose a system of resources from multiple types of cloud resource providers with a blueprint that enables users to perform RP operations on the different resources of the different resource providers using generic requests. As a result, the complexity faced by the user associated with the generation and operation of resources in a heterogeneous resource provider environment that includes multiple types of resource providers that each include their own native functionality may be significantly reduced. Furthermore, flexibility in composing such systems may be improved.

Figure 3A:
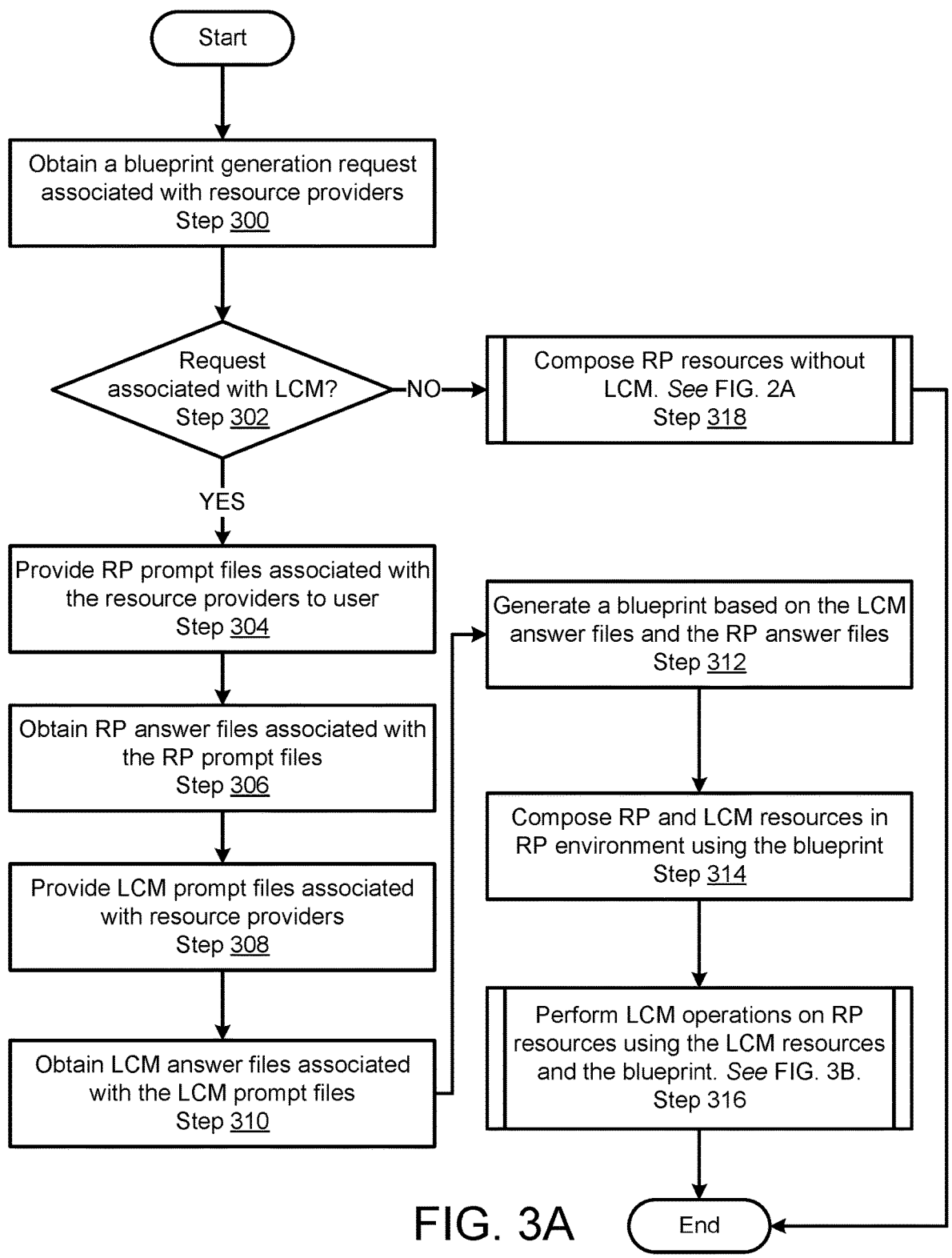
FIG. 3A shows a flowchart of a method for composing lifecycle management resources using a blueprint in accordance with one or more embodiments disclosed herein.

FIG. 3A shows a flowchart of a method for composing lifecycle management resources using a blueprint in accordance with one or more embodiments disclosed herein. The method may be performed by, for example, a blueprint orchestrator (e.g., 110, FIG. 1A). Other and/or additional components of the system illustrated in FIGS. 1A-1F may perform all, or a portion, of the method of FIG. 3A without departing from embodiments disclosed herein.

While FIG. 3A is illustrated as a series of steps, any of the steps may be omitted, performed in a different order, additional steps may be included, and/or any or all of the steps may be performed in a parallel and/or partially overlapping manner without departing from embodiments disclosed herein.

In step 300, a blueprint generation request associated with resource providers is obtained.

In one or more embodiments disclosed herein, the blueprint orchestrator may obtain the blueprint generation request from a client. The user of the client may generate the blueprint generation request. The blueprint generation request may include the RP types associated with the resource providers corresponding to the request, a list of one or more RP resources identifiers associated with each RP types, one or more LCM resource identifiers associated with each RP types, RP resource types associated with each RP resource identifier, and/or LCM resource types associated with each LCM identifier corresponding to RP resources LCM resources to be included in the blueprint. The blueprint generation request may include user information such as a user identifier, a client identifier, a client communication information (e.g., a URL address, an IP address, a username and password, encryption keys, etc.). The blueprint generation request may include other and/or additional information without departing from embodiments disclosed herein. The client may send the blueprint generation request using any appropriate method of data transmission without departing from embodiments disclosed herein. For example, the client may send the blueprint generation request as a message that includes one or more packets through one or more network devices that operatively connect the client to the blueprint orchestrator. The blueprint generation request associated with resource providers may be obtained by the blueprint orchestrator from the client via other and/or additional methods without departing from embodiments disclosed herein.

In step 302, a determination is made as to whether the request is associated with lifecycle management (LCM).

In one or more embodiments disclosed herein, the blueprint orchestrator may use the blueprint generation request to determine whether the request is associated with LCM. The blueprint orchestrator may check the blueprint generation request for LCM resource types. In one or more embodiments disclosed herein, if the blueprint generation request includes LCM resource types, then the blueprint orchestrator may determine that the blueprint generation request is associated with LCM. In one or more embodiments disclosed herein, if the blueprint generation request does not include LCM resource types, then the blueprint orchestrator may determine that the blueprint generation request is not associated with LCM. The determination as to whether the request is associated with LCM may be made via other and/or additional methods without departing from embodiments disclosed herein.

In one or more embodiments disclosed herein, if it is determined that the request is associated with LCM, then the method may proceed to step 304. In one or more embodiments disclosed herein, if it is determined that the request is not associated with LCM, then the method may proceed to step 318.

In step 304, RP prompt files associated with the resource providers are provided to the user.

In one or more embodiments disclosed herein, the blueprint orchestrator may generate RP prompt files for each resource of the resource providers specified in the blueprint generation request using RP prompt file templates associated with each resource type in the resource provider software repository. The blueprint orchestrator may include the RP resource identifiers and the corresponding user information and client information in each RP prompt file template to generate the RP prompt files. After generating the RP prompt files, the blueprint orchestrator may provide the RP prompt files to the client used by the user. The blueprint orchestrator may provide the RP prompt files to the client using any appropriate method of data transmission without departing from embodiments disclosed herein. For example, the blueprint orchestrator may send the RP prompt files as one or more messages that include one or more packets through one or more network devices that operatively connect the client to the blueprint orchestrator. The RP prompt files associated with the resource providers may be provided to the user via other and/or additional methods without departing from embodiments disclosed herein.

In step 306, RP answer files associated with the RP prompt files are obtained.

In one or more embodiments disclosed herein, in response to obtaining the RP prompt files, the user may generate RP answer files. The user may, through a user interface (e.g., a graphical user interface, a command-line interface, etc.) of the client, input the variables in the prompt files to generate the RP answer files. After the RP answer files are generated, the client may provide the RP answer files to the blueprint orchestrator. The client may send the RP answer files using any appropriate method of data transmission without departing from embodiments disclosed herein. For example, the client may send the RP answer files as one or more messages that include one or more packets through one or more network devices that operatively connect the client to the blueprint orchestrator. The RP answer files associated with the RP prompt files may be obtained by the blueprint orchestrator from the client via other and/or additional methods without departing from embodiments disclosed herein.

In step 308, LCM prompt files associated with the resource providers are provided to the user.

In one or more embodiments disclosed herein, the blueprint orchestrator may generate LCM prompt files for each resource of the resource providers specified in the blueprint generation request using LCM prompt file templates associated with each resource type in the resource provider software repository. The blueprint orchestrator may include the LCM resource identifiers and the corresponding user information and client information in each LCM prompt file template to generate the LCM prompt files. After generating the LCM prompt files, the blueprint orchestrator may provide the LCM prompt files to the client used by the user. The blueprint orchestrator may provide the LCM prompt files to the client using any appropriate method of data transmission without departing from embodiments disclosed herein. For example, the blueprint orchestrator may send the LCM prompt files as one or more messages that include one or more packets through one or more network devices that operatively connect the client to the blueprint orchestrator. The LCM prompt files associated with the resource providers may be provided to the user via other and/or additional methods without departing from embodiments disclosed herein.

In step 310, LCM answer files associated with the LCM prompt files are obtained.

In one or more embodiments disclosed herein, in response to obtaining the LCM prompt files, the user may generate LCM answer files. The user may, through a user interface (e.g., a graphical user interface, a command-line interface, etc.) of the client, input the variables in the prompt files to generate the LCM answer files. After the LCM answer files are generated, the client may provide the LCM answer files to the blueprint orchestrator. The client may send the LCM answer files using any appropriate method of data transmission without departing from embodiments disclosed herein. For example, the client may send the LCM answer files as one or more messages that include one or more packets through one or more network devices that operatively connect the client to the blueprint orchestrator. The LCM answer files associated with the LCM prompt files may be obtained by the blueprint orchestrator from the client via other and/or additional methods without departing from embodiments disclosed herein.

In step 312, a blueprint is generated using the LCM answer files and the RP answer files.

In one or more embodiments disclosed herein, the blueprint orchestrator generates a blueprint based on the answer files. The blueprint orchestrator may include a list of RP and LCM resources and their corresponding RP and LCM resource identifiers and RP types in the blueprint. The blueprint orchestrator may include the specification file identifier and the software package identifier associated with each LCM and RP resource. The blueprint orchestrator may also include the parameters included in the corresponding RP and LCM answer file for each RP and LCM resource in the blueprint. The blueprint orchestrator may further include the operation mappings associated with each resource in the blueprint. The blueprint orchestrator may provide a copy of a portion of the blueprint information (e.g., blueprint identifiers, RP resource identifiers, LCM resource identifiers, etc.) included in the blueprint to the client and/or user of the client to enable the client and/or the user to submit generic requests associated with the RP resources and LCM resources corresponding to the blueprint. The blueprint may be generated based on the RP and LCM answer files via other and/or additional methods without departing from embodiments disclosed herein.

In step 314, RP and LCM resources are composed in the RP environment using the blueprint.

In one or more embodiments, the blueprint orchestrator may send native RP creation requests for each RP and LCM resource specified in the blueprint to RP nodes of the RP environment. The creation requests may be mapped to the native RP format associated with the RP type corresponding to each RP and LCM resource using the operation mappings associated with each resource in the blueprint. The blueprint orchestrator may also provide parameters associated with each resource. The native RP format requests may be obtained by RP nodes that are associated with the RP type (e.g., executing the RP OS associated with the RP type). In response to obtaining the requests, the RP nodes may instantiate resources and begin executing RP services and LCM services that implement the RP resources and LCM resources using the specification files and the software packages associated with the resources in the resource provider software repository. The RP nodes may obtain the specification files and the software packages associated with the resources directly from the resource provider software repository or the specification files and the software packages may be indirectly obtained from the blueprint orchestrator. The RP resources and LCM resources may be composed in the RP environment using the blueprint via other and/or additional methods without departing from embodiments disclosed herein.

In step 316, LCM operations are performed on the RP resources using the LCM resources and the blueprint.

Figure 3B:
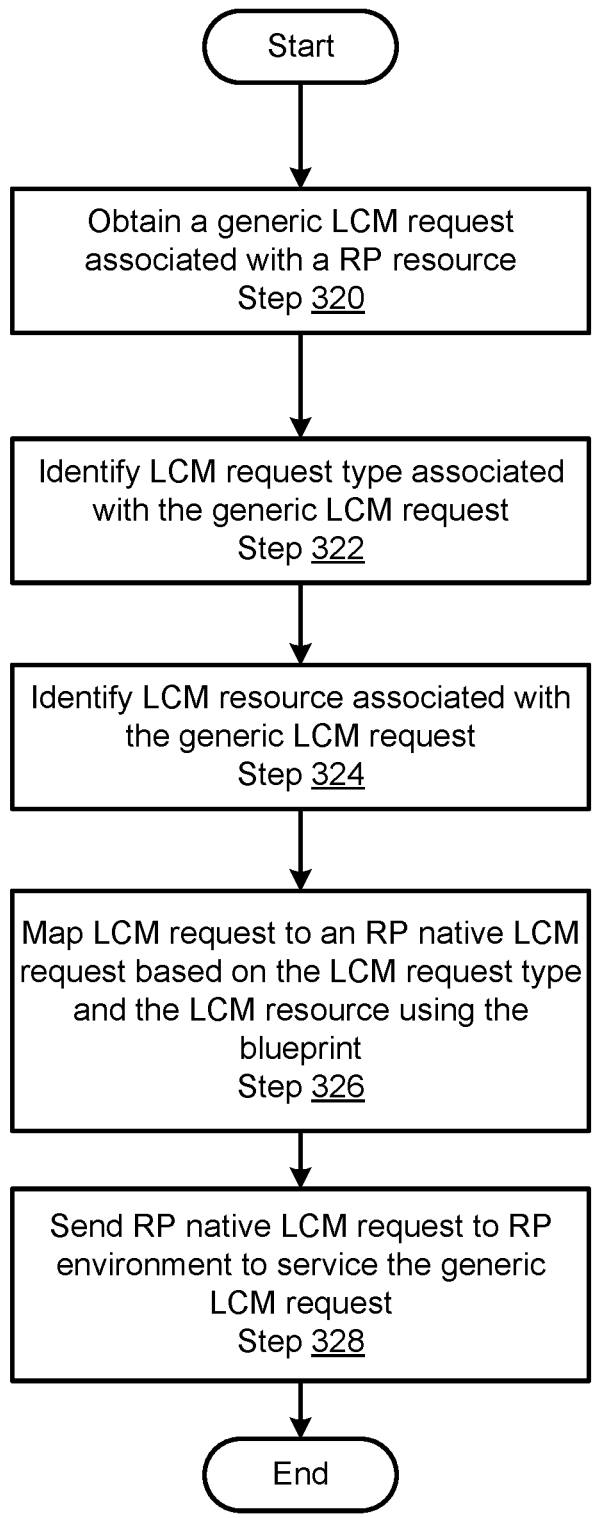
FIG. 3B shows a flowchart of a method for performing LCM operations on RP resources in an RP environment in accordance with one or more embodiments disclosed herein.

In one or more embodiments disclosed herein, the LCM operations may be performed using the method discussed in FIG. 3B. For additional information regarding performing LCM operations on RP resources using the LCM resources and the blueprint, refer to FIG. 3B.

The methods discussed FIG. 3B are associated with on demand or ad hoc LCM operations. In other embodiments disclosed herein, as is the nature of LCM operations, the LCM operations may be performed automatically by the LCM resources according to schedules and/or through continuous operation. For example, a telemetry collection resource may continually collect telemetry data associated with RP resources and provide the telemetry data to a telemetry data collector periodically according to a schedule (e.g., once a day). As another example, an upgrade resource may upgrade RP resources according to an upgrade schedule (e.g., once every six months). As yet another example, a security resource may continuously authorize requests made to the RP resources. LCM operations may be performed on the RP resources using the LCM resources and the blueprint via other and/or additional methods without departing from embodiments disclosed herein.

In one or more embodiments disclosed herein, the method may end following step 316.

In step 318, RP resources are composed without LCM.

In one or more embodiments disclosed herein, the LCM operations may be performed using the method discussed in FIG. 2A in steps 202-210. For additional information regarding composing RP resources without LCM, refer to FIG. 2A. The RP resources may be composed without LCM via other and/or additional methods without departing from embodiments disclosed herein.

In one or more embodiments disclosed herein, the method may end following step 318.

FIG. 3B shows a flowchart of a method for performing LCM operations on RP resources in an RP environment in accordance with one or more embodiments disclosed herein. The method may be performed by, for example, a blueprint orchestrator (e.g., 110, FIG. 1A). Other and/or additional components of the system illustrated in FIGS. 1A-1F may perform all, or a portion, of the method of FIG. 3B without departing from embodiments disclosed herein.

While FIG. 3B is illustrated as a series of steps, any of the steps may be omitted, performed in a different order, additional steps may be included, and/or any or all of the steps may be performed in a parallel and/or partially overlapping manner without departing from embodiments disclosed herein.

In step 320, a generic LCM request associated with a RP resource is obtained.

In one or more embodiments disclosed herein, the blueprint orchestrator may obtain the generic LCM request from a client. The user of the client may generate the generic LCM request. The generic LCM request may include the blueprint identifier associated with the blueprint that corresponds to the generic request. The blueprint orchestrator may identify the blueprint associated with the generic request using the blueprint identifier to use the blueprint in the subsequent steps of this method. The generic LCM request may further include the request type and may specify the LCM resource and one or more RP resources associated with the generic request. The generic LCM request may include other and/or additional information without departing from embodiments disclosed herein. The client may send the generic LCM request using any appropriate method of data transmission without departing from embodiments disclosed herein. For example, the client may send the generic LCM request as a message that includes one or more packets through one or more network devices that operatively connect the client to the blueprint orchestrator. The generic LCM request associated with an RP resource may be obtained by the blueprint orchestrator from the client via other and/or additional methods without departing from embodiments disclosed herein.

In step 322, a LCM request type associated with the LCM generic request is identified.

As discussed above, the generic operations including generic LCM operations may be performed on each RP resource. Also as discussed above, the generic LCM request may include the request type associated with the generic LCM request. The blueprint orchestrator may parse the request to obtain the request type associated with the generic LCM request. In one or more embodiments disclosed herein, the blueprint orchestrator may compare the request type included in the generic LCM request with the list of generic request types included in the blueprint. The blueprint orchestrator may identify the matching request type as the request type associated with the generic LCM request. The request type associated with the generic LCM request may be identified via other and/or additional methods without departing from embodiments disclosed herein.

In step 324, an LCM resource associated with the generic LCM request is identified.

As discussed above, the generic LCM request may specify one or more LCM resources associated with the generic LCM request. In one embodiment, the generic LCM request may include one or more LCM resource identifiers associated with the one or more LCM resources targeted by the generic LCM request. In such embodiments, the blueprint orchestrator may parse the generic LCM request to identify the one or more LCM resource identifiers included in the generic LCM requests. The blueprint orchestrator may then match the one or more LCM resource identifiers included in the generic LCM request with one or more LCM resource identifiers included in the blueprint to identify the LCM resource or LCM resources associated with the generic LCM request.

In another embodiment, the generic LCM request may include one or more LCM resource types associated with LCM resources targeted by the generic LCM request. In such embodiments, the blueprint orchestrator may parse the generic LCM request to identify the one or more LCM resource types included in the generic LCM requests. The blueprint orchestrator may then match the one or more LCM resource types included in the generic LCM request with one or more LCM resource types included in the blueprint. The blueprint orchestrator may then identify all LCM resources associated with the LCM resource types as LCM resources associated with the generic LCM request.

In yet another embodiment, the generic LCM request may be associated with all the LCM resources associated with the blueprint. The generic LCM request may include a parameter, tag, command, or other indicator that may specify that the generic LCM request is associated with all LCM resources. In such embodiments, the blueprint orchestrator may parse the generic LCM request to identify the parameter, tag, command, or other indicator that specifies that the generic LCM request is associated with all LCM resources. The blueprint orchestrator may then identify all LCM resources associated with the blueprint as LCM resources associated with the generic LCM request. The LCM resource associated with the generic LCM request may be identified via other and/or additional methods without departing from embodiments disclosed herein.

In one or more embodiments disclosed herein, the identified LCM resource may perform the generic LCM request. The blueprint orchestrator may again perform the methods discussed above in this step to further identify RP resources targeted by the generic LCM request.

In step 326, the generic LCM request is mapped to an RP native LCM request based on the resource type and the LCM resource using the blueprint.

In one or more embodiments disclosed herein, the blueprint orchestrator may then map the generic LCM request to an RP native LCM request based on the request type and the LCM resource using the blueprint. For each LCM resource associated with the generic LCM request, the blueprint orchestrator may map the request type to the corresponding RP native LCM request using the request mappings in the blueprint associated with the LCM resource. The blueprint orchestrator may include information required to perform the RP native LCM request such as, for example, the RP resource identifiers targeted by the RP native LCM request, the LCM resource identifier associated with the LCM resource to perform the LCM request, etc. The generic LCM request may be mapped to an RP native LCM request based on the request type and the LCM resource using the blueprint via other and/or additional methods without departing from the embodiments disclosed herein.

In step 328, the RP native LCM request is sent to RP to service the generic LCM request.

In one or more embodiments disclosed herein, the blueprint orchestrator may provide the RP native LCM request to the RP environment for each LCM resource associated with the generic LCM request. For each LCM resource, the blueprint orchestrator may provide the RP native LCM request to one or more RP nodes associated with the RP type corresponding to the LCM resource. The RP node associated with LCM resource may obtain the RP native LCM request. In response to obtaining the RP native LCM request, the RP node may perform the RP native LCM request on one or more target RP resources using the LCM resource associated with the RP native LCM request. The blueprint orchestrator may send the RP native LCM requests using any appropriate method of data transmission without departing from embodiments disclosed herein. For example, the blueprint orchestrator may send the RP native LCM requests as messages that include one or more packets through one or more network devices that operatively connect the RP nodes to the blueprint orchestrator.

After performing the RP native LCM request, the RP node may provide a response to the blueprint orchestrator and/or the client (e.g., directly or indirectly through the blueprint orchestrator) associated with the generic LCM request. For example, the response may include a notification the request has been performed, information resulting from the execution of the RP native LCM request (e.g., a list of RP resources associated with the generic LCM request, RP resource information associated with a generic LCM request, etc.), or other and/or additional information associated with the execution of RP native LCM requests without departing from embodiments disclosed herein. The RP node may send response using any appropriate method of data transmission without departing from embodiments disclosed herein. For example, the RP node may send the responses as messages that include one or more packets through one or more network devices that operatively connect the RP nodes to the blueprint orchestrator and/or the client. The RP native LCM request may be sent to RP environment to service the generic LCM request via other and/or additional methods without departing from embodiments disclosed herein.

In one or more embodiments disclosed herein, the method may end following step 328.

By performing the methods of FIG. 3A and FIG. 3B, a user may compose a system of resources from multiple types of cloud resource providers with a blueprint that enables users to perform LCM operations on the different resources of the different resource providers using generic requests. As a result, the complexity faced by the user associated with the generation and operation of resources in a heterogeneous resource provider environment that includes multiple types of resource providers that each include their own native functionality may be significantly reduced. Instead of simply generating, deleting, or updating resources in such an environment, lifecycle management operations may be performed on the resources greatly expanding the functionality of such systems. Furthermore, flexibility in managing, composing, and recomposing such systems may be improved.

Figure 4A:
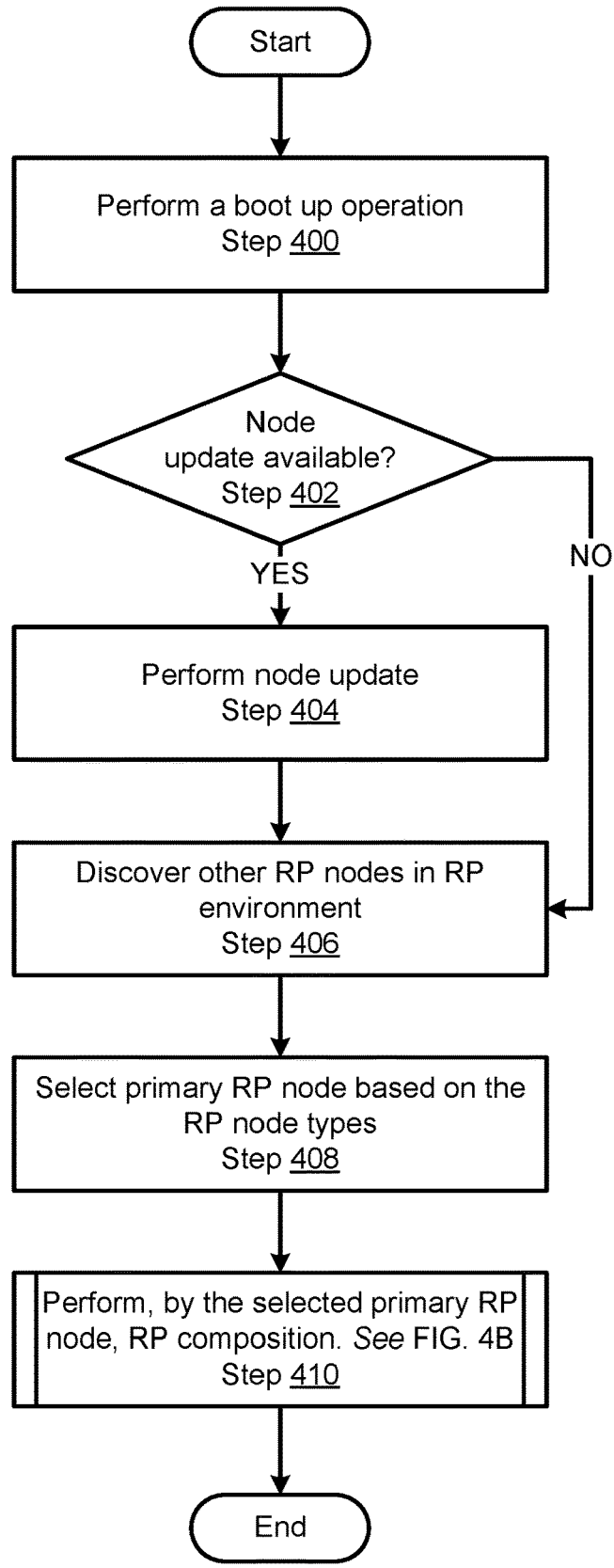
FIG. 4A shows a flowchart of a method for performing node discovery and primary node selection in accordance with one or more embodiments disclosed herein.

FIG. 4A shows a flowchart of a method for performing node discovery and primary node selection in accordance with one or more embodiments disclosed herein. The method may be performed by, for example, RP nodes (e.g., 142A, 142B, 142N, FIG. 1C). Other and/or components of the system illustrated in FIGS. 1A-1F may perform all, or a portion, of the method of FIG. 4A without departing from embodiments disclosed herein.

While FIG. 4A is illustrated as a series of steps, any of the steps may be omitted, performed in a different order, additional steps may be included, and/or any or all of the steps may be performed in a parallel and/or partially overlapping manner without departing from embodiments disclosed herein.

In step 400, a boot up operation is performed.

In one or more embodiments disclosed herein, the RP nodes perform the boot up operation. Each RP node may be deployed in the RP environment and powered on via hardware (e.g., a button) initiated by a user (e.g., system administrator, field technician, etc.) after being connected to a power supply. In one or more embodiments disclosed herein, after the initial power on, each RP node may load the initial OS from storage into memory and began executing the initial OS on one or more processors of the RP node. The boot up operation may be performed via other and/or additional methods without departing from embodiments disclosed herein.

In step 402, a determination is made as to whether a node update is available.

In one or more embodiments disclosed herein, each RP node may check with the resource provider software repository (e.g., 130, FIG. 1A) and/or another entity (e.g., an RP node manufacturer manager, not shown) to determine whether a node update is available. Each RP node may send a message to the resource provider software repository. The message may include the initial OS version and the RP OS versions in the RP OS repository. A controller of the resource provider software repository may use these versions of the initial OS and the RP OS to determine if new versions or new RP OSs are available for a node update. The resource provider software repository may then send a notification that either indicates that no new versions of the initial OS or RP OSs or that there are new versions of the initial OS or an RP OS or a new RP OS (e.g., associated with a new RP type). The messages and the notifications may be sent using any appropriate method of data transmission without departing from embodiments disclosed herein. For example, the messages and notifications may be sent as messages that include one or more packets through one or more network devices that operatively connect the RP nodes to the resource provider software repository. In one or more embodiments disclosed herein, if the notification indicates that there are no new versions of the initial OS or any RP OSs, then the RP nodes may determine that there is no node update available. In one or more embodiments disclosed herein, if the notification indicates that there is a new version of the initial OS or any RP OSs, then the RP nodes may determine that there is a node update available. The determination as to whether a node update is available may be made via other and/or additional methods without departing from embodiments disclosed herein.

In one or more embodiments disclosed herein, if it is determined that there is a node update available, then the method may proceed to step 404. In one or more embodiments disclosed herein, if it is determined that there is not a node update available, then the method may proceed to step 406.

In step 404, a node update is performed.

In one or more embodiments disclosed herein, the RP nodes that have an available update may send an update request to the resource provider software repository. The request may include the initial OS version and a list of RP OS versions of RP OSs included in the RP repository. In response to obtaining the request, the resource provider software repository may provide updates that include new versions of initial OS and/or one or more RP OSs. The requests and updates may be sent using any appropriate method of data transmission without departing from embodiments disclosed herein. For example, the requests and updates may be sent as messages that include one or more packets through one or more network devices that operatively connect the RP nodes to the resource provider software repository. In response to update the updates, the RP nodes may install or otherwise store the new versions in storage or memory such that the new versions of the operating systems (e.g., initial OS or one or more RP OSs) may be executed instead of the old versions. The node update may be performed via other and/or additional methods without departing from embodiments disclosed herein.

In step 406, other RP nodes in the RP environment are discovered.

In one or more embodiments disclosed herein, the RP nodes in the RP environment may discover the other RP nodes in the RP environment. Each RP node may send messages to the other RP nodes with discovery information associated with RP nodes. The discovery information may include, for example, the node type and the RP node identifier associated with the corresponding RP node. The RP nodes may be differentiated into two different types of nodes based on the underlying hardware configurations of the RP nodes. The node types may include compute nodes and storage nodes. Compute nodes may include more computing resources (e.g., a larger amount of processors, compute accelerators, graphics processing units, application specific integrated circuits, etc.) than storage nodes for performing compute intensive workloads (i.e., hosting compute intensive RP resources). Whereas, storage nodes may include more storage resources (e.g., more storage devices with more storage capacity) than compute nodes for performing more data intensive workloads (i.e., hosting data storage intensive RP resources). The discovery information associated with each RP node may be installed in the storage of each node by the RP node manufacturer. The discovery information may include other and/or additional information without departing from embodiments disclosed herein. The messages may be shared between the nodes using any appropriate method of data transmission within a group without departing from embodiments disclosed herein. For example, the messages may be sent as multicast messages through a multicast capable network protocol (e.g., IPv6 Multicast) executing on one or more network devices that operatively connect the RP nodes of the RP environment to each other. Other RP nodes of the RP environment may be discovered via other and/or additional methods without departing from embodiments disclosed herein.

In step 408, a primary RP node is selected based on the RP node types.

In one or more embodiments disclosed herein, the RP nodes select the primary RP node based on the RP node types associated with each RP node. The RP nodes may select an RP node that includes a storage node RP node type in order to not exhaust or take away compute resources required for the compute intensive workloads performed on the compute nodes to perform primary node functionalities. If there is only a single RP node that is a storage node in the RP environment, then the RP nodes may reach a consensus and select the single RP node that is the storage node to be the primary RP node. If there is multiple storage nodes in the RP nodes, then the RP nodes may reach a consensus to select a random storage node to be the primary RP node. The RP node identifier associated with the selected primary RP node may be shared amongst the RP nodes. The primary RP node may be selected based on the RP node types via other and/or additional methods without departing from embodiments disclosed herein.

In step 410, RP composition is performed by the selected primary RP node.

Figure 4B:
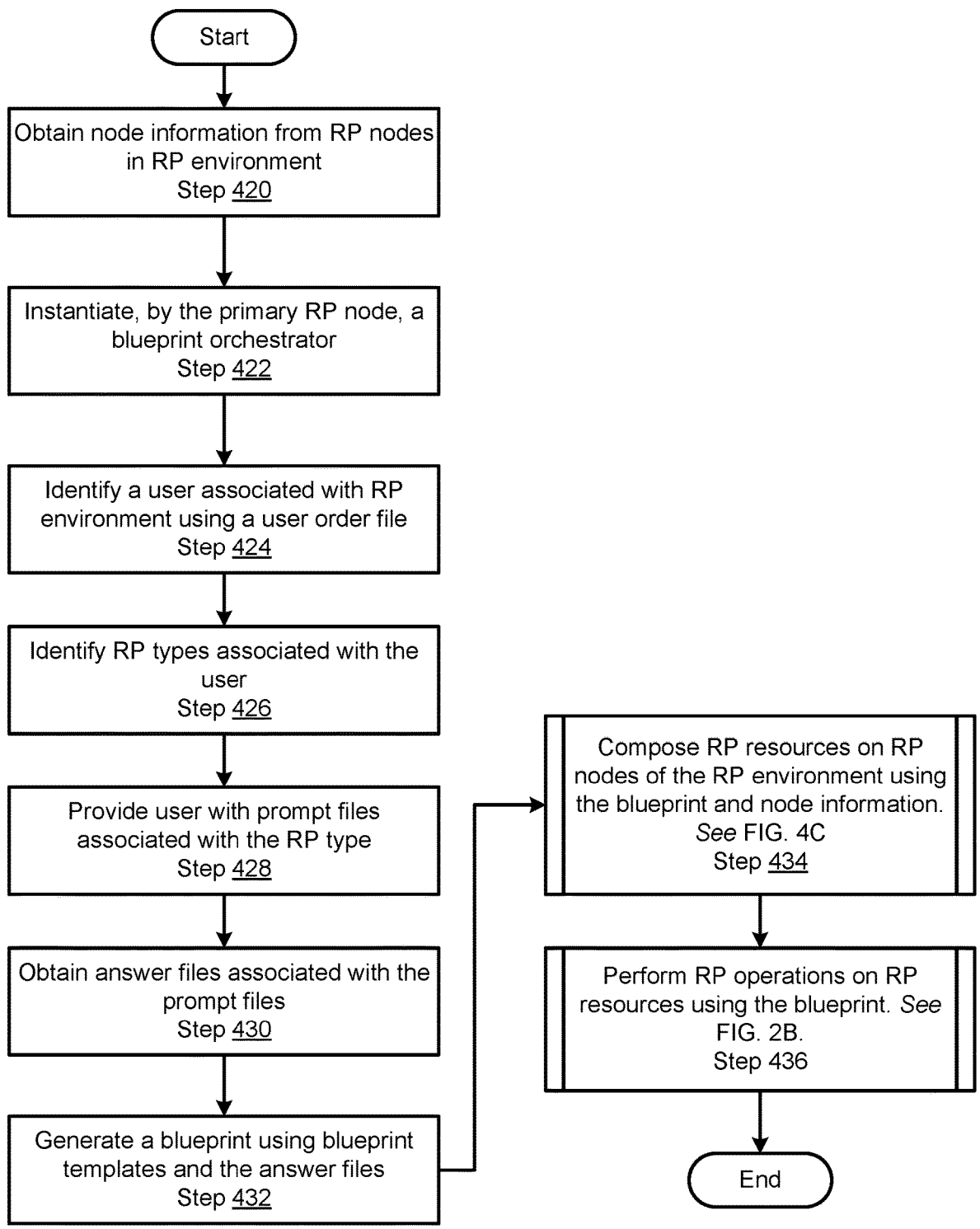
FIG. 4B shows a flowchart of a method for performing RP composition by a primary RP node in accordance with one or more embodiments disclosed herein.

In one or more embodiments disclosed herein, the RP composition may be performed by the primary RP node using the method discussed in FIG. 4B. For additional information regarding composing RP resources by the primary node, refer to FIG. 4B. RP composition may be performed by the primary RP node via other and/or additional methods without departing from embodiments disclosed herein.

In one or more embodiments disclosed herein, the method may end following step 410.

FIG. 4B shows a flowchart of a method for performing RP composition by a primary RP node in accordance with one or more embodiments disclosed herein. The method may be performed by, for example, a primary RP node (e.g., 150, FIG. 1E). Other and/or components of the system illustrated in FIGS. 1A-1F may perform all, or a portion, of the method of FIG. 4B without departing from embodiments disclosed herein.

While FIG. 4B is illustrated as a series of steps, any of the steps may be omitted, performed in a different order, additional steps may be included, and/or any or all of the steps may be performed in a parallel and/or partially overlapping manner without departing from embodiments disclosed herein.

In step 420, node information associated with the RP nodes in the RP environment is obtained.

In one or more embodiments disclosed herein, the primary RP node may send a request for node information the other RP nodes in the RP environment. In response to obtaining the request, each RP node may send messages to the primary RP node with node information associated with RP nodes. The primary RP node may obtain its own node information from storage. The node information may include, for example, the discovery information discussed above, node IP addresses, URL addresses, media access control (MAC) addresses, host names, hardware configuration (e.g., number and types of computing resources such as processors, storage devices, memory devices, graphics processing units, compute accelerators, ASICs, etc.), passwords, encryption keys, etc. associated with the corresponding RP node. The primary RP node may combine the node information associated with each node to generate the node management information. The node information associated with each RP node may be installed in the storage of each node by the RP node manufacturer. The node information may include other and/or additional information without departing from embodiments disclosed herein. The requests and messages may be shared between the RP nodes using any appropriate method of data transmission within a group without departing from embodiments disclosed herein. For example, the messages and requests may be sent as multicast messages through a multicast capable network protocol (e.g., IPv6 Multicast) executing on one or more network devices that operatively connect the RP nodes of the RP environment to each other. Node information may be obtained from the RP nodes of the RP environment via other and/or additional methods without departing from embodiments disclosed herein.

In step 422, a blueprint orchestrator is instantiated by the primary RP node.

In one or more embodiments disclosed herein, the primary RP node may instantiate a blueprint orchestrator. The primary RP node may send a request to the resource provider software repository for a blueprint orchestrator software package. The blueprint orchestrator software package may include all software resources necessary (e.g., software libraries, binaries, images, etc.) to execute a blueprint orchestrator on the primary RP node. In response to obtaining the request, the resource provider software repository may send a message including the blueprint orchestrator software package to the primary RP node. The request and the message may be sent using any appropriate method of data transmission without departing from embodiments disclosed herein. For example, the request and message may be sent as messages that includes one or more packets through one or more network devices that operatively connect the primary RP node to the resource provider software repository.

In other embodiments, the primary RP node may have the blueprint orchestrator software package pre-install in storage (e.g., in the blueprint templates (e.g., 170, FIG. 1E) by the RP node manufacturer. In such a scenario, the primary RP node may obtain the blueprint orchestrator software package from storage.

After obtaining the blueprint orchestrator software package, the primary RP node may use the blueprint orchestrator software package to instantiate the blueprint orchestrator on the primary RP node. As a result, the blueprint orchestrator may provide blueprint services (e.g., the functionality to perform steps 424-436). The blueprint orchestrator may be instantiated by the primary RP node via other and/or additional methods without departing from embodiments disclosed herein.

In step 424, a user associated with the RP environment is identified using a user order file.

As discussed above, the storage of the primary RP node may include a user order file. The user order file may include user order information. The primary RP node may obtain the user order file from storage and parse the user order file to obtain the user identifier, the client identifier, and client communication information associated with the user to identify the user associated with the RP environment. The user associated with the RP environment may be identified using the user order file via other and/or additional methods without departing from embodiments disclosed herein.

In step 426, RP types associated with the user are identified.

As discussed above, the user order file may further specify the one or more resource providers (e.g., the RP types) that the user desires to be installed in the RP environment. Accordingly, the primary RP node may obtain the user order file from storage and parse the user order file to obtain the resource provider types to identify the RP types associated with the user. The RP types associated with the user may be identified using the user order file via other and/or additional methods without departing from embodiments disclosed herein.

In step 428, prompt files associated with the RP type are provided to the user.

In one or more embodiments disclosed herein, the blueprint orchestrator of the primary RP node may generate prompt files for each resource of the RP types identified in the user order file using prompt file templates associated with each resource type stored in the blueprint templates or obtained from resource provider software repository. The blueprint orchestrator may generate resource identifiers (or, in alternative embodiments, include prompts in the prompt files for a user to generate resource identifiers) and include the corresponding user information and client information in each prompt file template to generate the prompt files. After generating the prompt files, the blueprint orchestrator may provide the prompt files to the client used by the user using the client communication information specified in the user order file. The blueprint orchestrator may provide the prompt files to the client using any appropriate method of data transmission without departing from embodiments disclosed herein. For example, the blueprint orchestrator may send the prompt files as one or more messages that include one or more packets through one or more network devices that operatively connect the client to the primary RP node executing the blueprint orchestrator. The prompt files associated with the RP types may be provided to the user via other and/or additional methods without departing from embodiments disclosed herein.

In step 430, answer files associated with the prompt files are obtained.

In one or more embodiments disclosed herein, in response to obtaining the prompt files, the user may generate answer files. The user may, through a user interface (e.g., a graphical user interface, a command-line interface, etc.) of the client, input the variables in the prompt files to generate the answer files. In other embodiments, the user may delete or ignore prompt files associated with resources of an RP type that the user does not desire to be composed on the RP environment. In yet other embodiments, the user may request the primary RP node for additional prompt files or generate multiple answer files using a single prompt file to compose multiple instances of RP resources. After the answer files are generated, the client may provide the answer files to the blueprint orchestrator. The client may send the answer files using any appropriate method of data transmission without departing from embodiments disclosed herein. For example, the client may send the answer files as one or more messages that include one or more packets through one or more network devices that operatively connect the client to the primary RP node executing the blueprint orchestrator. The answer files associated with the prompt files may be obtained by the blueprint orchestrator from the client via other and/or additional methods without departing from embodiments disclosed herein.

In step 432, a blueprint is generated using blueprint templates and the answer files.

In one or more embodiments disclosed herein, the blueprint orchestrator generates a blueprint based on the answer files using blueprint templates. The blueprint orchestrator may include a list of resources and their corresponding resource identifiers and RP types in the blueprint based on the answer files. The blueprint orchestrator may include the specification file identifier and the software package identifier associated with each resource using blueprint templates. The blueprint orchestrator may also include the parameters included in the corresponding answer file for each resource in the blueprint. The blueprint orchestrator may further include the operation mappings associated with each resource in the blueprint using the blueprint templates. The blueprint orchestrator may provide a copy of a portion of the blueprint information (e.g., blueprint identifiers, RP resource identifiers, etc.) included in the blueprint to the client and/or user of the client to enable the client and/or the user to submit generic requests associated with the RP resources corresponding to the blueprint. The blueprint may be generated using blueprint templates and the answer files via other and/or additional methods without departing from embodiments disclosed herein.

In step 434, RP resources are composed on the RP nodes of the RP environment using the blueprint and the node information.

In one or more embodiments disclosed herein, the primary RP node may select the RP nodes of the RP environment to host each RP type using the user order file and the node management information. The user order file may specify the amount of RP nodes associated with each RP type. The primary RP node may assign RP nodes RP types by matching RP node identifiers of the RP nodes specified by the node management information with the assigned RP node type to satisfy the user order file. Additionally, the primary RP node may assign RP types to nodes based on workload requirements and corresponding node types. The primary RP node may include a mapping of workload requirements associated with each RP type and RP node types. The primary node may assign RP types associated with high compute workloads to RP nodes that are compute nodes and assign RP types associated with high storage workload to RP nodes that are storage nodes. The primary RP node may update the node management information to specify the RP types associated with each node. After assigning RP types to the RP nodes, the primary RP node may send a message to the RP nodes that specify their assigned RP type.

In one or more embodiments, after sending the assignments to each RP node, the primary RP node may send messages including native RP creation requests for each resource specified in the blueprint to RP nodes of the RP environment that provide the corresponding RP type. The creation requests may be mapped to the native RP format associated with the RP type corresponding to each resource using the operation mappings associated with each resource in the blueprint. The blueprint orchestrator may also provide parameters associated with each resource. The native RP format requests may be obtained by RP nodes that are associated with the RP type (e.g., executing the RP OS associated with the RP type).

The primary RP node may send the assignment and native RP creation request messages using any appropriate method of data transmission without departing from embodiments disclosed herein. For example, the primary RP node may send the assignments as messages that include one or more packets through one or more network devices that operatively connect the primary RP node to the other RP nodes in the RP environment. RP resources may be composed on the RP nodes of the RP environment using the blueprint and the node information via other and/or additional methods without departing from embodiments disclosed herein.

Figure 4C:
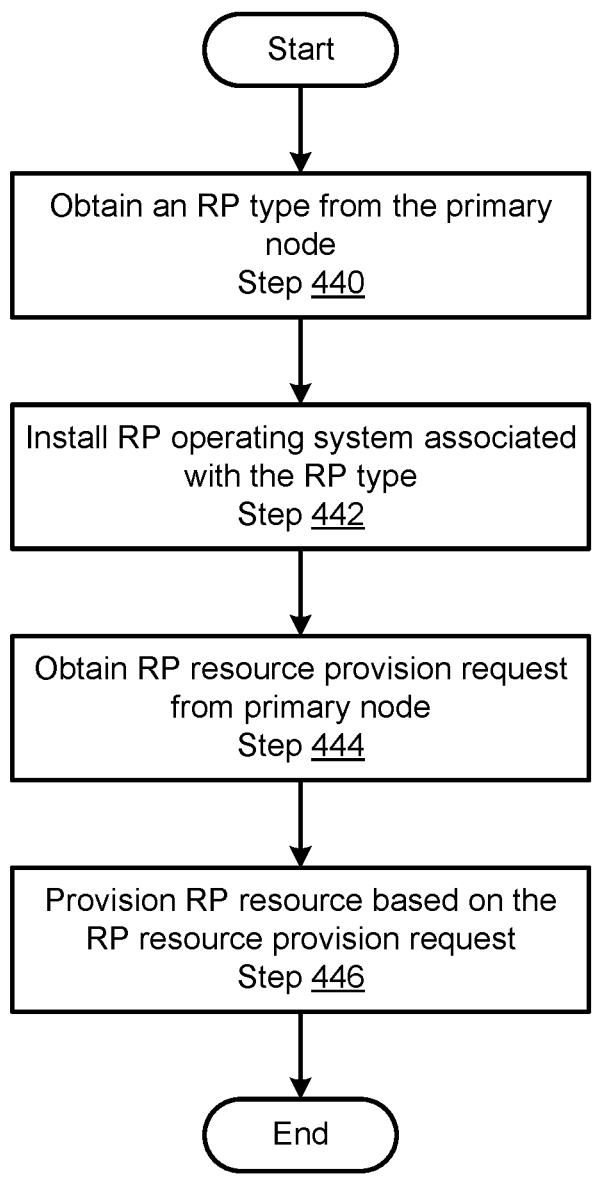
FIG. 4C shows a flowchart of a method for performing RP composition by an RP node in accordance with one or more embodiments disclosed herein.

For additional information regarding the composition of RP resources in the RP environment, refer to FIG. 4C.

In step 436, RP operations are performed on RP resources using the blueprint.

In one or more embodiments disclosed herein, the blueprint orchestrator of the primary RP node may facilitate the performance of RP operations on the RP resources of the RP environment using the blueprint via the methods discussed in FIG. 2B. For additional information regarding the performance of RP operation on the RP resources using the blueprint, refer to FIG. 2B. RP operations may be performed on RP resources using the blueprint via other and/or additional methods without departing from embodiments disclosed herein.

In one or more embodiments disclosed herein, the method may end following step 436.

FIG. 4C shows a flowchart of a method for performing RP composition by an RP node in accordance with one or more embodiments disclosed herein. The method may be performed by, for example, an RP node (e.g., 180, FIG. 1F). One, a portion, or all nodes in the RP environment, including the primary RP node, may perform the method of FIG. 4C. Other and/or components of the system illustrated in FIGS. 1A-1F may perform all, or a portion, of the method of FIG. 4C without departing from embodiments disclosed herein.

While FIG. 4C is illustrated as a series of steps, any of the steps may be omitted, performed in a different order, additional steps may be included, and/or any or all of the steps may be performed in a parallel and/or partially overlapping manner without departing from embodiments disclosed herein.

At step 440, an RP type is obtained from the primary RP node.

In one or more embodiments disclosed herein, as discussed above, the primary RP node may send a message to the RP node (e.g., a non-primary RP node). The message may specify an assigned RP type associated with the RP node. The message may include other and/or additional information without departing from embodiments disclosed herein. The primary RP node may send the assignment message using any appropriate method of data transmission without departing from embodiments disclosed herein. For example, the primary RP node may send the assignment=as a message that includes one or more packets through one or more network devices that operatively connect the primary RP node to the RP node. The RP type may be obtained from the primary RP node via other and/or additional methods without departing from embodiments disclosed herein.

At step 442, an RP OS associated with the RP type is installed.

In one or more embodiments disclosed herein, in response to obtaining the RP type assignment from the primary RP node, the RP node may use the RP OS repository to install the RP OS associated with the RP type. As discussed above, the RP OS repository may include RP OSs and the associated RP type corresponding with each RP OS. The RP node may match the RP type included in the assignment message with an RP type included in the RP OS repository to identify the RP OS associated with the RP type. The RP node may then install the RP OS associated with RP type such that the RP node provides the RP functionality associated with the RP type (e.g., may be able to compose RP resources associated with the RP type and obtain and service native RP requests associated with the RP type). For example, the identified RP OS may be loaded in memory and executed by a processor of the RP node. The RP OS associated with the RP type may be installed via other and/or additional methods without departing from embodiments disclosed herein.

At step 444, an RP resource creation request is obtained from the primary RP node.

In one or more embodiments, as discussed above, the primary RP node may send messages including native RP creation requests for each RP resource associated with the RP type specified in the blueprint to the RP node. The creation requests may be mapped to the native RP format associated with the RP type corresponding to each resource of the RP type using the operation mappings associated with each resource in the blueprint. The messages may also include parameters associated with each resource. Messages may include other and/or additional information associated with creating resources on the RP node without departing from embodiments disclosed herein.

At step 446, the RP resource is provisioned based on the RP resource provision request.

In response to obtaining the RP creation requests, the RP node may instantiate the RP resources RP resources associated with the RP creation requests and begin executing RP services that implement the resources using the specification files and the software packages associated with the resources in the resource provider software repository. The RP nodes may obtain the specification files and the software packages associated with the resources directly from the resource provider software repository or the specification files and the software packages may be indirectly obtained from the blueprint orchestrator of the primary RP node.

In one or more embodiments disclosed herein, the method may end following step 446.

By performing the methods of FIGS. 4A-4C, a user may order RP nodes to form an RP environment capable of providing a turnkey resource provider environment experience. As a result, the RP nodes of the RP environment include the functionality to compose a system of resources from multiple types of cloud resource providers with a blueprint that enables users to perform RP operations on the different resources of the different resource providers using generic requests. Additionally, previously composed nodes may be repurposed from one RP type to another without requiring the user to obtain more RP nodes. Such a composition and repurposing of resources in a heterogeneous resource provider environment may require minimal user involvement. As a result, the complexity faced by the user associated with the generation and refurbishing of resources in a heterogeneous resource provider environment that includes multiple types of resource providers that each include their own native functionality may be significantly reduced. Furthermore, flexibility in composing and refurbishing such systems may be improved.

Figure 5:
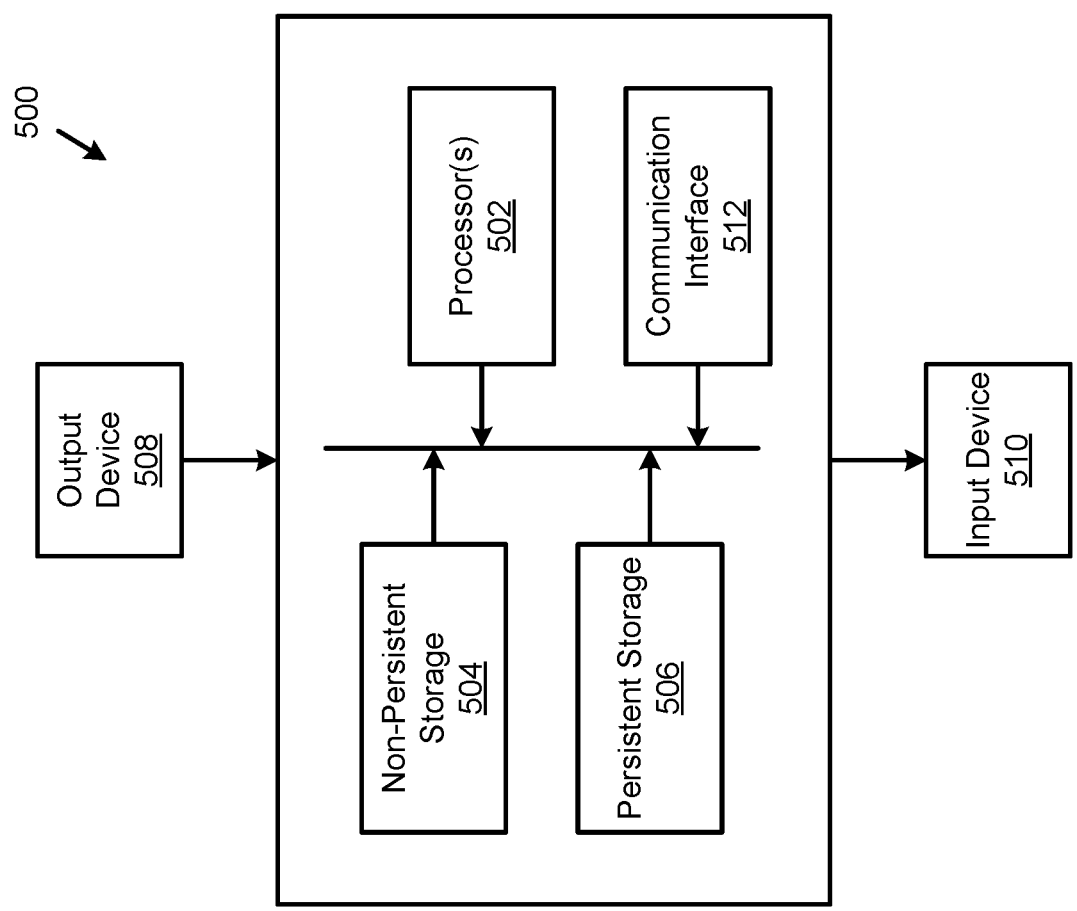
FIG. 5 shows a diagram of a computing device in accordance with one or more embodiments disclosed herein.

As discussed above, embodiments disclosed herein may be implemented using computing devices. FIG. 5 shows a diagram of a computing device in accordance with one or more embodiments disclosed herein. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one or more embodiments, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one or more embodiments, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

As used herein, an entity that is programmed to or configured to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

One or more embodiments disclosed herein may be implemented using instructions executed by one or more processors of the data management device. Further, such instructions may correspond to computer readable instructions that are stored on one or more non-transitory computer readable mediums. In one or more embodiments, any non-volatile storage (not shown) and/or memory (not shown) of a computing device or system of computing devices may be considered, in whole or in part, as non-transitory computer readable mediums, which may store software and/or firmware. Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein. The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

The problems discussed above should be understood as being examples of problems solved by embodiments disclosed herein and the embodiments disclosed herein should not be limited to solving the same/similar problems. The disclosed embodiments are broadly applicable to address a range of problems beyond those discussed herein.

While the embodiments disclosed herein have been described with respect to a limited number of embodiments, those skilled in the art, having benefit of this disclosure, will appreciate that other embodiments can be devised which do not depart from the scope of the technology as disclosed herein. Accordingly, the scope of the embodiments disclosed herein should be limited only by the attached claims.

What is claimed is:

1. A method for provisioning and managing resources in a resource provider environment, comprising:

obtaining, by a primary resource provider (RP) node in an RP environment, node information associated with other RP nodes in the RP environment;

instantiating a blueprint orchestrator using a blueprint orchestrator template;
in response to instantiating the blueprint orchestrator:
identifying a user associated with the RP environment using a user order file;
identifying a first RP type and a second RP type associated with the user;
providing prompt files associated with the first RP type and the second RP type to the user;
obtaining answer files associated with the prompt files from the user;
generating a blueprint based on the answer files and a blueprint template;
composing RP resources on the RP environment using the blueprint and node information; and
performing operations on the RP resources using the blueprint.

2. The method of claim 1, wherein the blueprint comprises:
first RP resource information associated with a first RP resource of the first RP type;
second RP resource information associated with a second RP resource of the second RP type; and
request mappings associated with the first RP type and the second RP type.

3. The method of claim 2, wherein the prompt files comprise prompts for the user to provide the first RP resource information and the second RP resource information.

4. The method of claim 3, wherein the answer files comprise the first RP resource information and the second RP resource information provided by the user.

5. The method of claim 2, wherein the requests mappings comprise:
a mapping of generic requests to first RP native requests associated with the first RP type; and
a mapping of the generic requests to second RP native requests associated with the second RP type.

6. The method of claim 5, wherein the first RP native requests are different from the second RP native requests.

7. The method of claim 5, wherein composing RP resources on the RP resources on the RP environment using the blueprint comprises:
sending, by a primary node, the first RP type and a first RP native request of the first RP native requests to a second RP node of the RP environment; and
sending, by the primary node, the second RP type and a second RP native request of the second RP native requests to a third RP node of the RP environment.

8. The method of claim 7, further comprising:
installing, by the second RP node, an RP operating system associated with the first RP type; and
provisioning, by the second RP node, an RP resource based on the first RP native request.

9. The method of claim 8, wherein the second RP node comprises an RP operating system repository comprising the RP operating system associated with the first RP type and an RP operating system associated with the second RP type.

10. The method of claim 1, wherein prior to obtaining node information from other RP nodes in the RP environment:
performing, by a first set of RP nodes in the RP environment, a boot up operation;
discovering, by the first set of RP nodes, a second set of RP nodes in the RP environment;
sharing, by the first set of RP nodes, a node type associated with the first set of RP nodes with the second set of RP nodes; and
selecting, by the first set of RP nodes, a first RP node to be the primary RP node based on the node types.

11. The method of claim 10, wherein the node types comprise:
storage nodes; and
compute nodes.

12. The method of claim 1, wherein the user order file specifies user order information associated with desired RP environment compose using the RP environment.

13. A system for provisioning and managing resources on resource providers, comprising:
a resource provider (RP) environment; and
a primary RP node of the RP environment, comprising a processor and memory, and configured to:
obtain node information associated with other RP nodes in the RP environment;
instantiate a blueprint orchestrator using a blueprint orchestrator template;
in response to instantiating the blueprint orchestrator:
identify a user associated with the RP environment using a user order file;
identify a first RP type and a second RP type associated with the user;
provide prompt files associated with the first RP type and the second RP type to the user;
obtain answer files associated with the prompt files from the user;
generate a blueprint based on the answer files and a blueprint template;
compose RP resources on the RP environment using the blueprint and node information; and
perform operations on the RP resources using the blueprint.

14. The system of claim 13, wherein the blueprint comprises:
first RP resource information associated with a first RP resource of the first RP type;
second RP resource information associated with a second RP resource of the second RP type; and
request mappings associated with the first RP type and the second RP type.

15. The system of claim 14, wherein the prompt files comprise prompts for the user to provide the first RP resource information and the second RP resource information.

16. The system of claim 15, wherein the answer files comprise the first RP resource information and the second RP resource information provided by the user.

17. A non-transitory computer readable medium comprising computer readable program code, which when executed by a computer processor enables the computer processor to perform a method for provisioning and managing resources on resource providers, the method comprising:
obtaining, by a primary resource provider (RP) node in an RP environment, node information associated with other RP nodes in the RP environment;
instantiating a blueprint orchestrator using a blueprint orchestrator template;
in response to instantiating the blueprint orchestrator:
identifying a user associated with the RP environment using a user order file;
identifying a first RP type and a second RP type associated with the user;

providing prompt files associated with the first RP type and the second RP type to the user;

obtaining answer files associated with the prompt files from the user;

generating a blueprint based on the answer files and a blueprint template;

composing RP resources on the RP environment using the blueprint and node information; and performing operations on the RP resources using the blueprint.

18. The non-transitory computer readable medium of claim 17, wherein the blueprint comprises:

first RP resource information associated with a first RP resource of the first RP type;

second RP resource information associated with a second RP resource of the second RP type; and request mappings associated with the first RP type and the second RP type.

19. The non-transitory computer readable medium of claim 18, wherein the prompt files comprise prompts for the user to provide the first RP resource information and the second RP resource information.

20. The non-transitory computer readable medium of claim 19, wherein the answer files comprise the first RP resource information and the second RP resource information provided by the user.

* * * * *